United States Patent [19]

Ichinose et al.

[11] Patent Number: 4,953,224
[45] Date of Patent: Aug. 28, 1990

[54] PATTERN DEFECTS DETECTION METHOD AND APPARATUS

[75] Inventors: Toshiaki Ichinose; Takanori Ninomiya, both of Yokohama; Yasuo Nakagawa, Chigasaki, all of Japan

[73] Assignee: Hitachi, Ltd., Tokyo, Japan

[21] Appl. No.: 158,125

[22] Filed: Feb. 16, 1988

Related U.S. Application Data

[63] Continuation of Ser. No. 779,126, Sep. 23, 1985, abandoned.

[30] Foreign Application Priority Data

Sep. 27, 1984 [JP] Japan ................................. 59-200401
Oct. 10, 1984 [JP] Japan ................................. 59-208177

[51] Int. Cl.$^5$ ............................................. G06K 9/00
[52] U.S. Cl. ........................................ 382/8; 358/101; 358/106
[58] Field of Search ........................... 382/8, 9, 26, 56; 358/106, 101, 107

[56] References Cited

U.S. PATENT DOCUMENTS

| | | | |
|---|---|---|---|
| 4,069,411 | 11/1978 | Morton | 382/26 |
| 4,183,013 | 1/1980 | Agrawala | 382/26 |
| 4,189,711 | 2/1980 | Frank | 382/26 |
| 4,504,971 | 3/1985 | Nadler | 382/26 |
| 4,550,434 | 10/1985 | Shimada | 382/9 |
| 4,589,140 | 5/1986 | Bishop | 382/8 |
| 4,607,385 | 8/1986 | Maeda | 382/9 |
| 4,624,013 | 11/1986 | Urushibata | 382/9 |
| 4,630,306 | 12/1986 | West et al. | 382/26 |
| 4,635,289 | 1/1987 | Doyle | 382/8 |
| 4,654,583 | 3/1987 | Ninomiya | 324/73 PC |
| 4,718,101 | 1/1988 | Ariga et al. | 382/26 |
| 4,791,676 | 12/1988 | Flickner et al. | 382/26 |

FOREIGN PATENT DOCUMENTS 0250480 12/1985 Japan ................................. 382/26

Primary Examiner—Leo H. Boudreau
Assistant Examiner—Joseph Mancuso
Attorney, Agent, or Firm—Antonelli, Terry, Stout & Kraus

[57] ABSTRACT

A pattern defect detecting method and apparatus are disclosed on a connectivity processor to input a binary picture signal pattern and a pad position coordinate and outputting connectivity data between pads. Here, the connectivity processing refers to a processing for giving the identical number to one aggregation of connected or linked pads for the pads given to a serial pattern. In the connectivity processor wherein a plane on which the drawn pattern to be inspected is scanned by a linear sensor, the connectivity processing can be releazed almost concurrently with the scanning by driving a temporary memory.

Also, a pattern defect detecting apparatus the above-mentioned connectivity. The invention processing coping with the difficulties of a required inspection level, and also represents a processing time of each embodiment theoretically. A moving time of the bed on which an inspecting object is placed and others are added to the real processing time.

7 Claims, 18 Drawing Sheets

FIG. 3
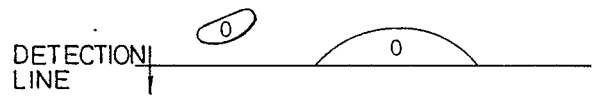
FIG. 4
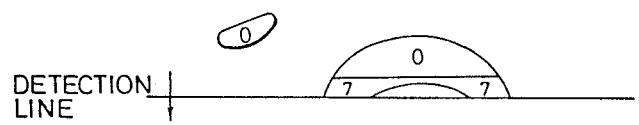
FIG. 5
| ADDRESS | DATA |
|---|---|
| 1 | 0 |
| 2 | 0 |
| PAD 3 NUMBER | 0 |
| 4 | 0 |
| 5 | 0 |
| 6 | 0 |
| 7 | 7 |
| ⋮ | ⋮ |
T
LABEL
TEMPORARY NUMBER
FIG. 6
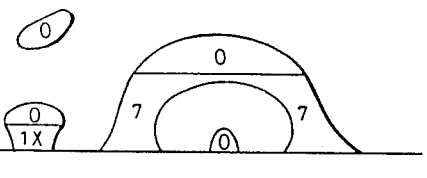
FIG. 7
| ADDRESS | DATA |
|---|---|
| 1 | 1 |
| 2 | 0 |
| 3 | 0 |
| 4 | 0 |
| 5 | 0 |
| 6 | 0 |
| 7 | 7 |
| ⋮ | ⋮ |
T FIG. 8
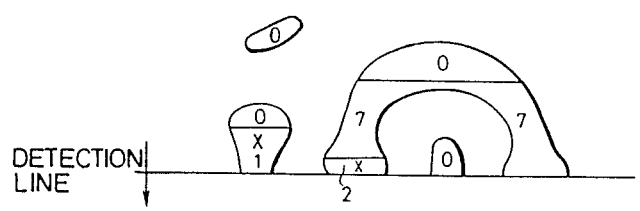
FIG. 9
| ADDRESS | DATA |
|---|---|
| 1 | 1 |
| 2 | 2 |
| 3 | 0 |
| 4 | 0 |
| 5 | 0 |
| 6 | 0 |
| 7 | 7 |
| ⋮ | ⋮ |
FIG. 10
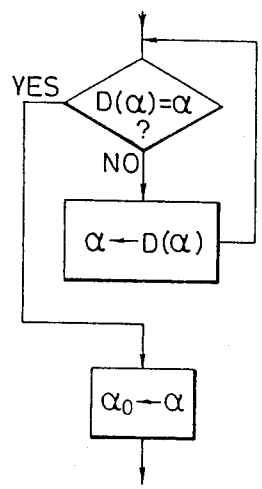
FIG. 11
| ADDRESS | DATA |
|---|---|
| 1 | 1 |
| 2 | 2 |
| 3 | 0 |
| 4 | 0 |
| 5 | 0 |
| 6 | 0 |
| 7 | 2 |
| ⋮ | ⋮ |

FIG. 12
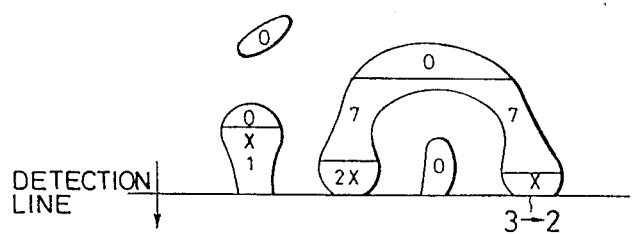
FIG. 13
| ADDRESS | DATA |
|---|---|
| 1 | 1 |
| 2 | 2 |
| 3 | 2 |
| 4 | 0 |
| 5 | 0 |
| 6 | 0 |
| 7 | 2 |
| ⋮ | ⋮ |
T
FIG. 14
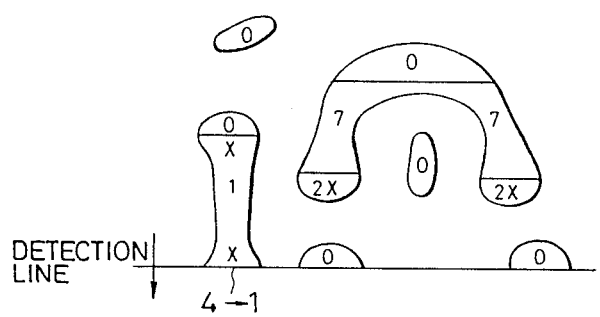
FIG. 15
| ADDRESS | DATA |
|---|---|
| 1 | 1 |
| 2 | 2 |
| 3 | 2 |
| 4 | 1 |
| 5 | 0 |
| 6 | 0 |
| 7 | 2 |
| ⋮ | ⋮ |
T

FIG. 16
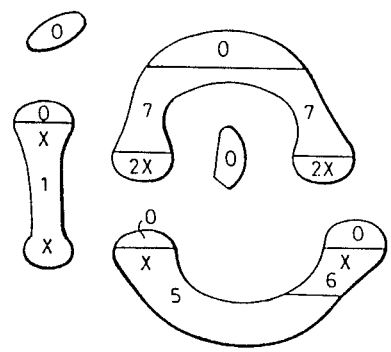
FIG. 17
| ADDRESS | DATA |
|---------|------|
| 1 | 1 |
| 2 | 2 |
| 3 | 2 |
| 4 | 1 |
| 5 | 5 |
| 6 | 6 |
| 7 | 2 |
| ⋮ | ⋮ |
T
FIG. 18
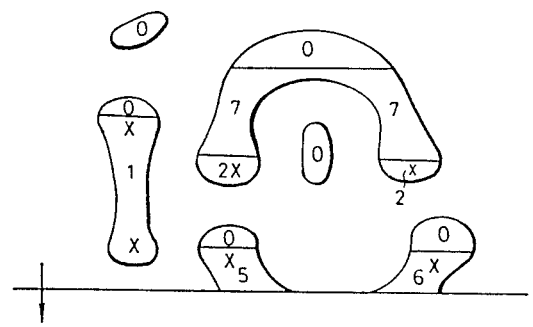
FIG. 19
| ADDRESS | DATA |
|---------|------|
| 1 | 1 |
| 2 | 2 |
| 3 | 2 |
| 4 | 1 |
| 5 | 5 |
| 6 | 5 |
| 7 | 2 |
| ⋮ | ⋮ |
T

| AP | START POINT | END POINT | LABEL |
|---|---|---|---|
| $AP_1$ | $u_1^t$ | $v_1^t$ | $L_1^t$ |
| $AP_2$ | $u_2^t$ | $v_2^t$ | $L_2^t$ |
| $AP_3$ | $u_3^t$ | $v_3^t$ | $L_3^t$ |
| ⋮ | ⋮ | ⋮ | ⋮ |

$LT_1$

T

| ADDRESS | DATA | FLAG |
|---|---|---|
| 1 | 0 | ⊠ |
| 2 | 2 | ⊠ |
| 3 | 2 | ⊠ |
| 4 | 4 | ⊠ |
| 5 | 5 | 1 |
| 6 | 5 | 1 |
| 7 | 6 | 1 |
| 8 | 6 | 1 |

PAD NUMBER: 1–4
TEMPORARY NUMBER: 5–8

T

| ADDRESS | DATA | FLAG |
|---|---|---|
| 1 | 0 | ⊠ |
| 2 | 2 | ⊠ |
| 3 | 2 | ⊠ |
| 4 | 4 | ⊠ |
| 5 | 5 | 1 |
| 6 | 5 | 0 |
| 7 | 5 | 0 |
| 8 | 5 | 0 |

FIG. 24
(TABLE MEMORY 10 IN FIG. 1)
| ADDRESS | $x_i$ | $y_i$ | $N_i$ |
|---|---|---|---|
| 1 | $x_1$ | $y_1$ | $N_1$ |
| 2 | $x_2$ | $y_2$ | $N_2$ |
| 3 | $x_3$ | $y_3$ | $N_3$ |
| ⋮ | ⋮ | ⋮ | ⋮ |
FIG. 25
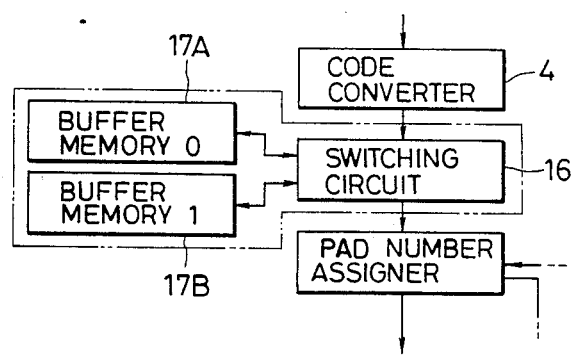
FIG. 26
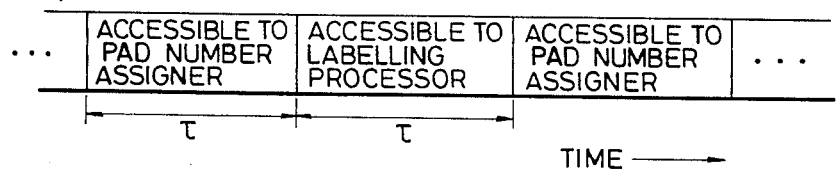

PICTURE INPUT PORT

CODE CONVERTER

GRID NUMBER ASSIGNER PART

FIG. 30
LABELLING PROCESSOR
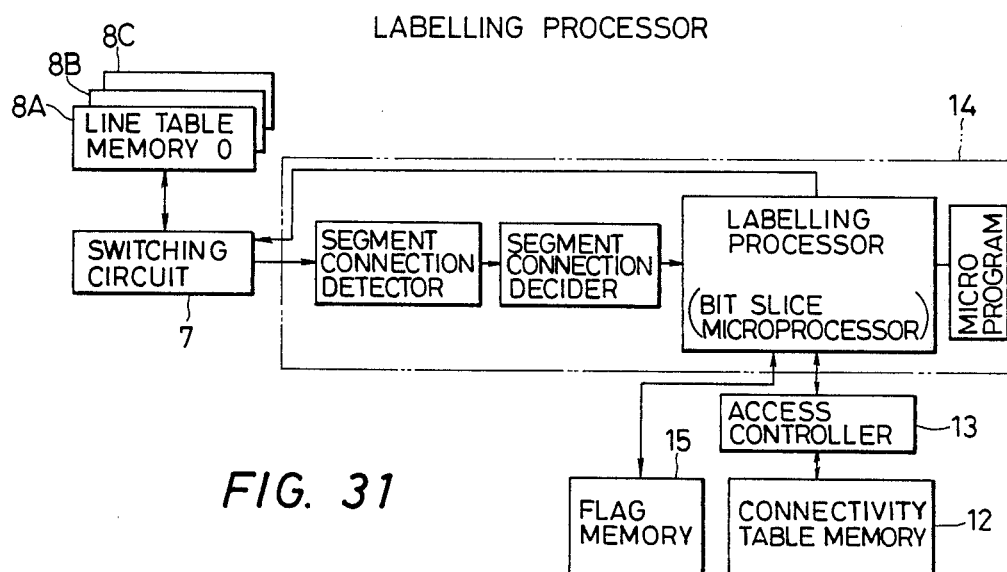
FIG. 31
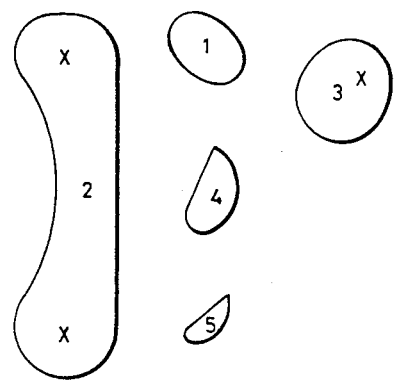
FIG. 32
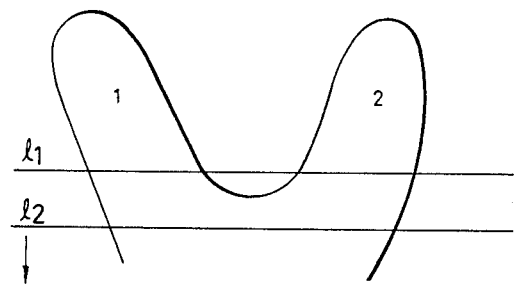
FIG. 33
| ADDRESS | DATA |
|---------|------|
| 1 | 1 |
| 2 | 1 |
| ⋮ | ⋮ |

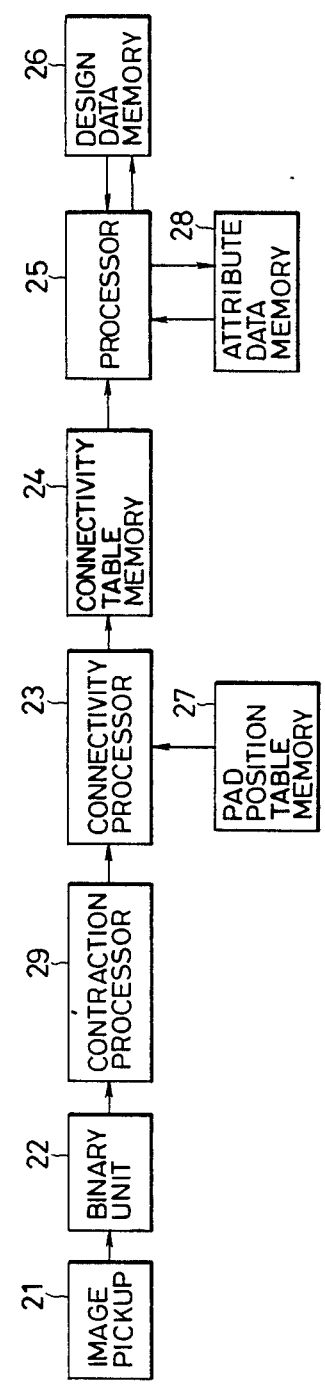
FIG. 41
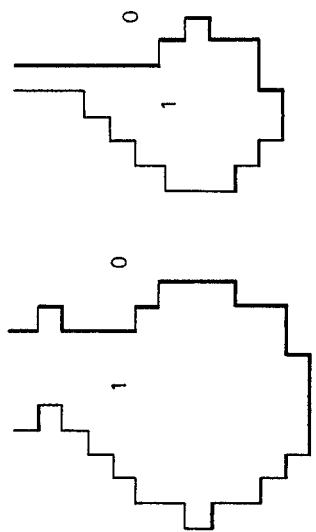
FIG. 44
FIG. 43
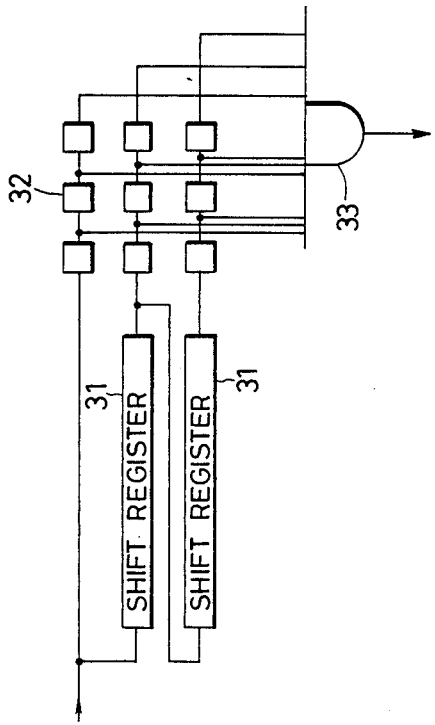
FIG. 42

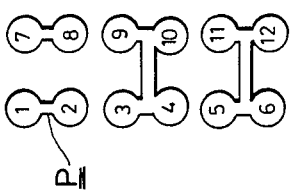
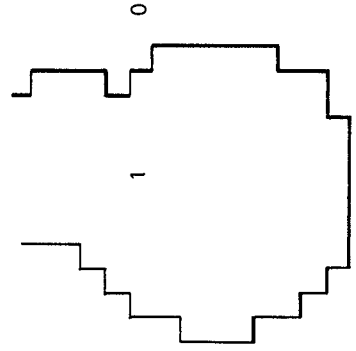
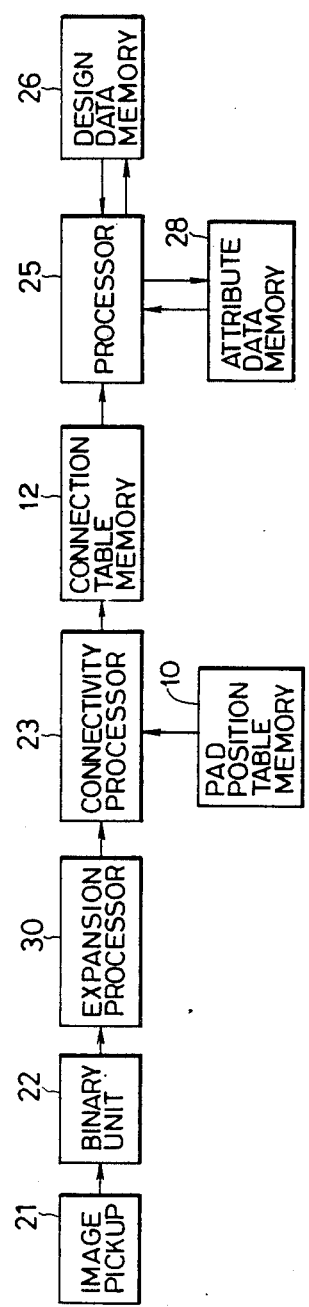
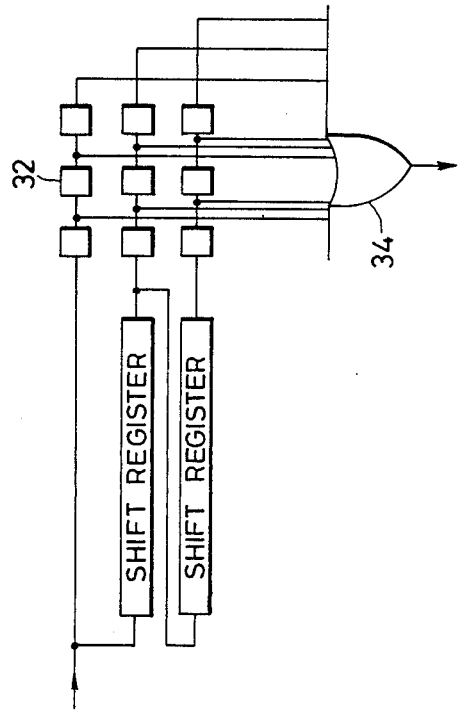
FIG. 48
FIG. 51
FIG. 50
FIG. 49

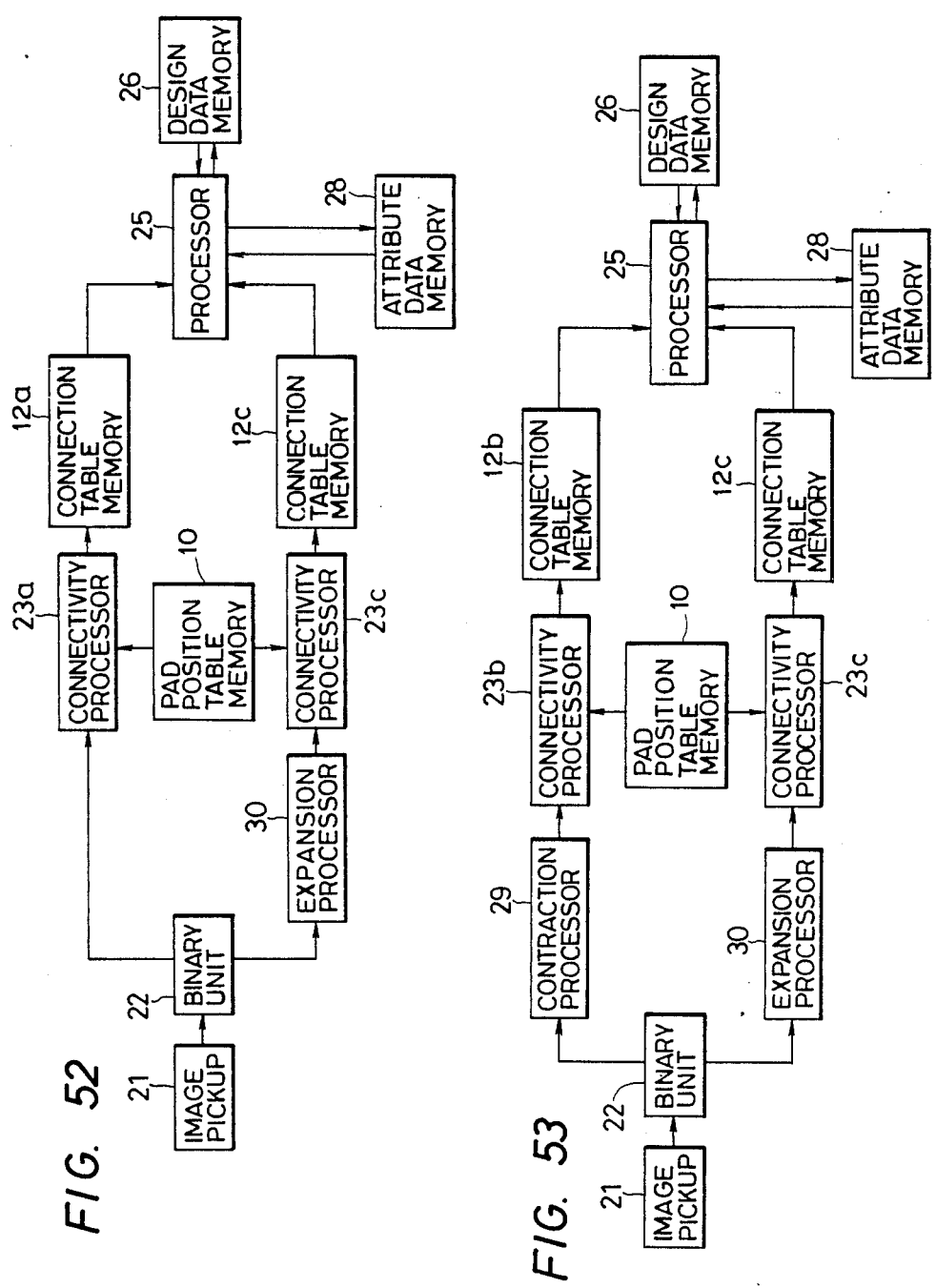

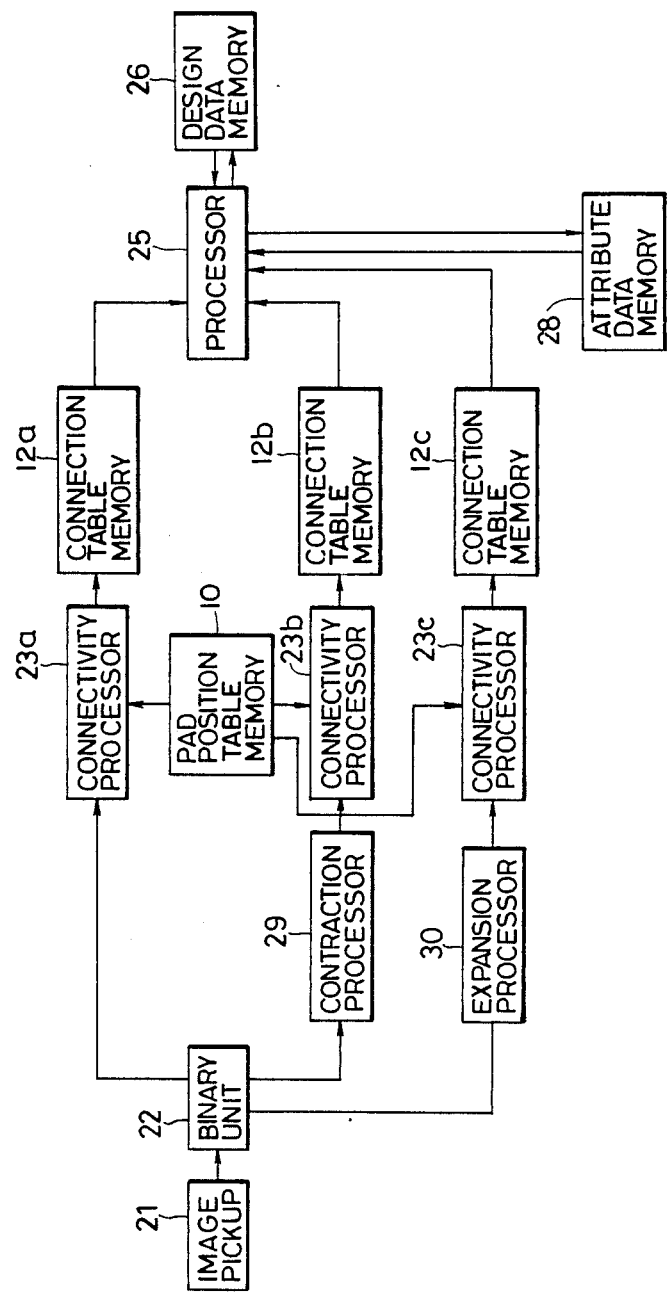

PATTERN DEFECTS DETECTION METHOD AND APPARATUS

This application is a continuation of application Ser. No. 779,126, filed Sept. 23, 1985, now abandoned.

BACKGROUND OF THE INVENTION

1. Field Application of the Invention

This invention relates to a technique for detecting, at high speed, as to whether a plurality of points specified on a pattern of detected binary picture image are properly connected through the pattern. The invention is further concerned with a method and apparatus for detecting the presence of pattern defects and, more specifically for detecting the electric conduction of a printed circuit pattern without contact and at high speed.

2. Description of the Prior Art

When inspecting a circuit pattern for defects, the circuit pattern is detected by a linear sensor or the like in order to obtain a binary picture image for detecting defects such as disconnection, short circuit and others, and to determine whether the specific points are concatenated through a pattern on the detected picture image. Arts disclosed in Japanese Patent Publication No. 16217/1983 "DETECTING METHOD FOR CONCATENATED DOMAINS" and "A STUDY OF RUBBING OUT AND NUMBERING CONCATENATED DOMAINS" (Shingaku Giho, the *Journal of the Institute of Electronics and Communication Engineers of Japan*, IE78-9) will be taken up for method to check a concatenation of such binary picture image pattern. However, the techniques disclosed above are intended for separating and extracting each of concatenated elements of the patterns (portion with the value 1 or 0) of the detected binary picture image.

Consequently, when five independent patterns (each being a closed domain pattern with binary logic level 1 as shown, for example, in FIG. 31 are present in the form of binary picture image, numbers 1 to 5 called labels, are given to all the patterns, as indicated from processing on the above-mentioned methods, and these labels are stored into a memory in a table format. The word "label" as used above is representative of a pad number or a temporary number subsequently given. However, such separation of all the patterns is not always required in order to be able to inspect defects such as a disconnections and others, and only a concatenation namely, a connectivity among the three points with a mark x thereon should be detected. In such cases, the labels 1, 4 and 5 are not required.

When an object pattern to be checked for defects, as a whole, is very complicated, a conceivable method is such that continuity will be detected concurrently while detecting the binary picture image line by line, horizontally, for example, by means of a linear sensor. In this case, for example, if the concatenation, or the connectivity, is checked by detecting the binary-coded picture image sequentially on a horizontal detection line from above as shown in FIG. 32, patterns with labels 1, 2 put thereon are judged to be separate at a point in time coming as late as a detection line 11. However, it is found that the patterns with labels 1, 2 are connected according to the detection line 12 appearing subsequently, which must be stored in a table on the memory. FIG. 33 indicates a construction of the table, wherein addresses 1, 2 (relative addresses in practice) are assigned the corresponding labels 1, 2, respectively, and as a data of the content, the labels 1 and 2 are written as they are when patterns with the labels 1, 2 are decided to be still isolated. However, when these are found to be continuous, the data are rewritten to the smaller value. FIG. 33 indicates the state after correspond to a representative value, for example, data have been rewritten, and thus it is found that the patterns with the labels 1, 2 are of the same type and are connected consequently. Further, if the patterns given in FIG. 32 are branched into n branches upward, n units of addresses and n units of data coordinated therewith are stored in the data table of FIG. 33.

As described above, when a connectivity of all the patterns is extracted during detection of the binary picture image on a linear sensor or the like according to the prior art, the memory capacity must be large enough to store or load labels equal in number to the connected patterns present on the binary picture image of FIG. 31 and extra labels (n−1 pieces of extra labels) become necessary in the case of a pattern branched plurally upward, as in the FIG. 32. However, in case where the pattern to be detected is not simple like FIG. 31 but FIG. 32 and is a circuit pattern, or the like, which is excessively complicated and large, the prior art technique would add the requirement that the working memory capacity be exceedingly large. Consequently, processing requires an enormously long time therefor, so that a real connectivity is difficult to be extracted.

There is a pattern inspecting art applicable to that for extracting the pattern connectivity. That is, a pickup system and a processing system for expanding and contracting the binary picture image are combined with the connectivity extracting art. As an associated art with such pattern inspecting art, which was disclosed in Japanese Patent Laid-Open No. 179343/1983, will be taken up.

The technique calls for detecting the number of detected binary patterns or the contracted patterns or the expanded patterns thereof within a specific range, comparing them with the number of patterns obtained from a standard pattern, and judging them to be defective when both numbers do not coincide. Thus a strict pattern alignment at each detected picture image is not required.

However, the conventional art cannot accurately indicate the position of a defect. Further, when a pattern separation (disconnection) or a pattern fusion (short circuit) simultaneously occurs within the specific range for counting the respective number of patterns, the number of patterns does not vary from the standard number of patterns; consequently, defects may be overlooked.

SUMMARY OF THE INVENTION

One object of the invention is to provide a connectivity detecting method and apparatus capable of detecting whether a plurality of points specified externally on the pattern of a detected binary picture image are concatenated through the pattern without increasing memory capacity. To attain the object, a different number (a pad number subsequently given) is assigned to each of the points to be detected for connectivity and coordinated with the address in memory, and when some point is found on any pattern, the number of the point is given as a label or pad numbers for the pattern, which is written as data at the address correspond to corresponding to the point, and when different labels are given to any same patterns, these are rewritten to one of them in the memory according to a predetermined method, so that the arbitrary two points are judged to be connected only when the labels loaded in the coordinated address are the same.

Another object of the invention is to provide a method and apparatus for detecting pattern defects such as disconnection of a printed circuit pattern, short circuit, pattern width being small, pattern interval being small and the like without contact and at high speed. To attain this object, the inventive features are such that a connectivity of two points whereat a binary-coded pattern is selected will be checked. That is, connectivity data are generated with the number (pad number) given to one point on the selected pattern serving as an address and with the number (root pad number subsequently given) of a representative point of the pattern serving as data. A pattern defect can be detected and so decided by comparing the connectivity data with predetermined design data.

Here, the design data refers to reference data in a cyclic list structure obtained by extracting a connectivity from a correct-connected pattern to be inspected beforehand. Ordinarily, the design data is formed using design information of an automatic pattern designer since manually forming the data from a printed circuit, or the like, is very difficult.

Another object of the invention is to provide a method and apparatus for forming automatically the design data in the cyclic list structure, being modified if necessary, by extracting the connectivity relation from an actual circuit pattern.

BRIEF DESCRIPTION OF THE DRAWINGS

FIG. 2 to FIG. 19 are schematic drawings for illustrating a connectivity detecting method relating to this invention;

FIG. 24 is a drawing for showing a memorizing format of addresses corresponding to label numbers, marked points coordinates and pad numbers of patterns thereto;

FIG. 25 is a drawing showing a circuit consisting of a buffer memory and a switching circuit instead of FIFO;

FIG. 26 is a drawing illustrating an access control method to a connectivity table memory;

FIG. 27, FIG. 28, FIG. 29 and FIG. 30 are block diagrams of a picture input part of the connectivity detecting apparatus, a code converter part, a pad number assigner part, a labeling part respectively which are given in one embodiment;

FIG. 31, FIG. 32 and FIG. 33 are drawings illustrating a conventional concatenation detecting method.

FIG. 41 is a block diagram of a second embodiment of the invention of a pattern defect detecting apparatus;

FIG. 42 is a block diagram representing a construction of a contraction processor;

FIG. 43 is a drawing showing one example of a binary pattern;

FIG. 44 is a pattern drawing obtainable through applying a contraction to the pattern shown in FIG. 43;

FIG. 48 is a block diagram of a fourth embodiment of a pattern defect detecting apparatus;

FIG. 49 is a block diagram representing a construction of an expansion processor;

FIG. 50 is a pattern drawing obtainable through applying expansion to the pattern shown in FIG. 43;

FIG. 51 is a plan view of a pattern obtainable through applying an expansion to the pattern shown in FIG. 45;

FIG. 52, FIG. 53 and FIG. 54 are block diagrams of a fifth, a sixth and a seventh embodiment, respectively, of pattern defect detecting apparatus.

DETAILED DESCRIPTION OF THE INVENTION

This invention refines the prior U.S. patent application Ser. No. 600957, now U.S. Pat. No. 4,654,583 which is descriptive of a connectivity detecting art in the former half and a pattern defect detecting art for which the art commands a main part in the latter half.

(A) Detection of connectivity

Figure 1:
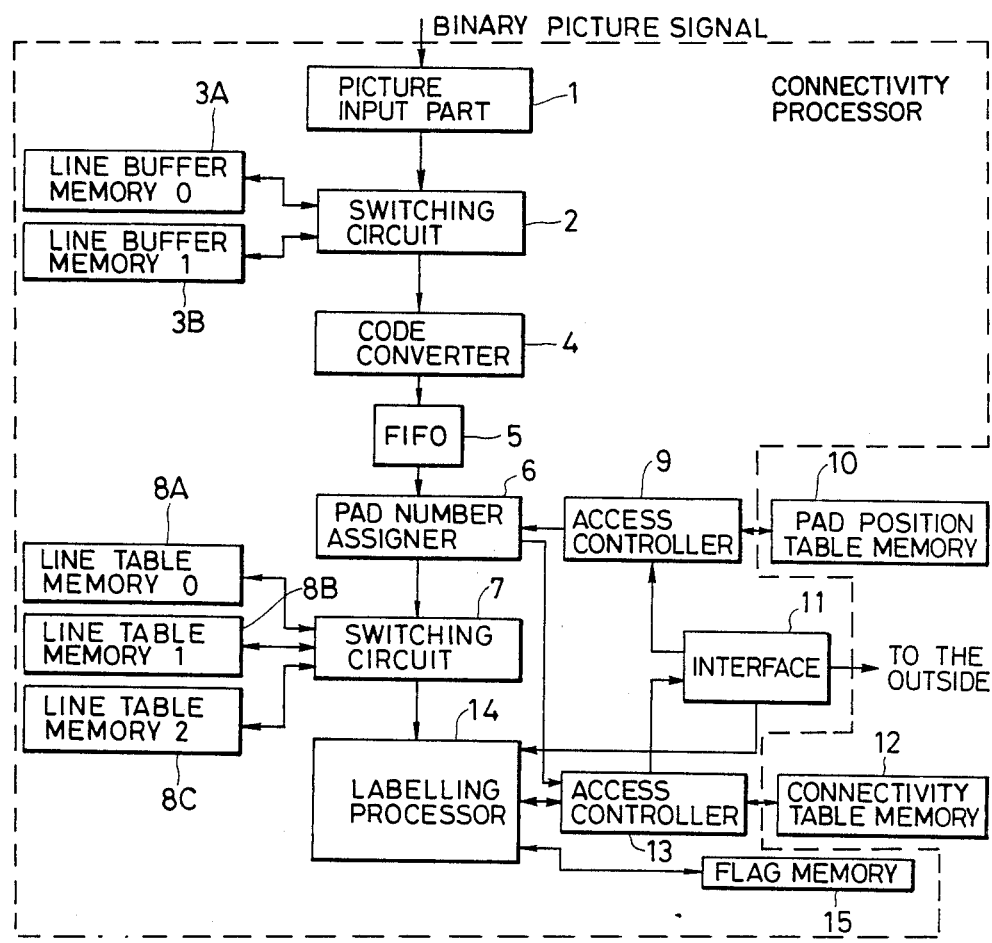
FIG. 1 is a general block diagram of a connectivity processor in a pattern defect detecting apparatus given in one embodiment of this invention.

As shown in FIG. 1, the general construction comprises a picture input part 1 for preprocessing a binary picture signal, a code conversion part 4 for detecting a picture element alteration part and its address, a pad number assigner part 6 for detecting whether or not a specified point is present between the picture element alteration addresses, a labeling processor 14 for detecting a connectivity on a line adjacent to the picture element alteration address and others, the arrangement being such that each part is capable of operating in a parallel mode by interposing line buffer memories 3A, 3B and so on between the picture input part 1 and the code conversion part 4, FIFO 5 between the code conversion part 4 and the pad number assigner part 6, and line table memories 8A, 8B, 8C and so on between the pad number assigner part 6 and the labeling part 14.

The theoretical basis will now be discussed for detailed description of the invention. <Theoretical Basis>

Figure 2:
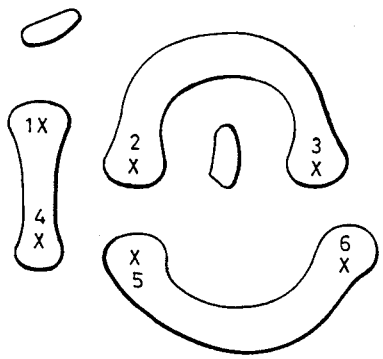

First, the theoretical basis will be described on the assumption that object patterns are, for example, as shown in FIG. 2, and pad numbers 1 to 6 are assigned to points (hereinafter called specific points) for checking connectivity.

Figure 35:
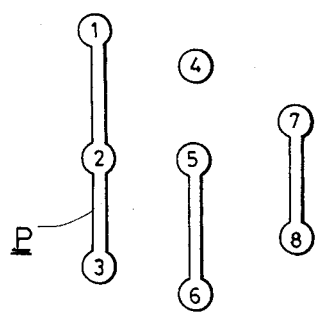
FIG. 35 and FIG. 36 are plan views showing two examples of a circuit pattern.
Figure 36:
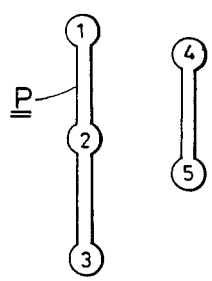

Actually, the object patterns are printed circuit patterns as shown in FIG. 35 and FIG. 36. It is convenient to name the specific points a pad number because the points are situated at the pad portion of the printed circuit pattern.

When any one specific point has not yet been detected when detection is carried out sequentially on the patterns from a line upward in FIG. 2 by means of a linear sensor or the like, a common label o is given to each pattern as shown in FIG. 3. Here, the wording "labeling the patterns" describes the action when an area is prepared at every detected pattern in a memory, and a pad number or temporary number is entered in a label field within the area, the detailed method for which will be described later in this application. The pattern-coordinated working area (a line table given later, FIG. 21) corresponds to a different concept from a connection table described below.

Any character which is not identified by the pad number can be given to the common label mentioned above including "0", which is called a temporary number. First, the temporary number 0 is labeled when a pattern is detected from a binary picture image in a background. Next, the situation wherein detection proceeds so as to arrive at the condition shown in FIG. 4 will be considered. One pattern begins to branch into two, but the specific point is not yet detected. However, if the label 0 is left assigned as it is, since the label 0 is common to all the patterns for which the specific point still has not been detected, the branching patterns cannot be discriminated from other patterns when the specific point is found later thereon. Consequently, when the pattern with label 0 branches as mentioned, a number (called a temporary number) which is not identified by pad number, the other temporary number, and which is greater (or smaller) than both numbers at all times, is given as a temporary label, which is given a reference numeral 7 here.

A connectivity table T for storing connectivities between specific points will now be described. The connectivity table T is stored in a connectivity table memory 12 in FIG. 1, and the table consists of an address part a data part, as shown in FIG. 5. Then the situation is such that a label data D(I) is given to the pattern of which address I and to which a pad number I belongs. In the case where reference character I is a pad number and D(I)=0, the specific point on the pad has not yet been found. In the case where reference character I is a temporary number and D(I)≠0, a label of the pattern to which the temporary number I belongs is data D(I). In the case where reference character I is a temporary number and D(I)=0, the temporary number has not yet been used a pattern with the tentative number I is D(I), and D(I)=0 represents the case where the grid has not yet been found when I is a grid and also the case where the tentative number has not yet been used when I is a tentative number. At that point in time of FIG. 4, no specific points I=1 to 6 are found, therefore the data D(I)=0, I=1 to 6 as shown in FIG. 5, and for address I=7, the branched patterns are still not concatenated with other patterns with labels, but concatenated with itself consequently to D(7)=7. Next, the assumption is that the detection proceeds to find a specific point 1 for the first time as shown in FIG. 6. In this case, the specific point 1 has been found but is not concatenated with a pattern having another label (pad number), therefore a label 1 is given to the pattern, and further the data D(1)=1 (FIG. 7) on the connectivity table T. Then, the detection proceeds to find a specific point 2 as shown in FIG. 8. In this case, the pattern in which the specific point 2 is found is labeled 2 and then the data at an address 2 of the connectivity table T is made to D(2)=2. At this point in time, the connectivity table T corresponds to that shown in FIG. 9. In this case, however, the pattern in which the specific point 2 has been found is already labeled 7 other than 0, therefore it is unified to one label for labeling with it to one connected pattern. Assuming now two labels $\alpha$, $\beta$ are assigned to the same pattern as described, a general method is such that a representative label $\alpha_0$, $\beta_0$, respectively, should be selected. In the case shown in FIG. 9, 1, 2 and 7 are representative labels. That is, an address and the corresponding data correspond to the same numbers in a representative label.

A method of selecting a representative label $\alpha_0$ from a given label $\alpha$ is, as shown in FIG. 10, to repeat replacing $\alpha$ with $D(\alpha)$ until $D(\alpha)=\alpha$.

The operation is also executed on $\beta$ to obtain $\beta_O$, the pattern is only labeled with min $(\alpha_0, \beta_0)$ (or max $(\alpha_0, \beta_0)$ when a temporary number is smaller than the pad number at all times), and further $D(\alpha)$, $D(\beta)$ of the connectivity table T are given at the value. In this case, $\alpha_0=2$, $\beta_0=7$ to the labels 2,7 as will be apparent from FIG. 9, therefore the pattern is labeled 2, and D(2), D(7) of the table T are also given at 2 at the same time. The connectivity table T stands as FIG. 11 in this case.

Let it be assumed that the detection is furthered and thus the specific point 3 is found as shown in FIG. 12. As in the case where the specific point 2 was found, first the branched pattern on the right side is labeled 3 on table in FIG. 13 in this case, and D(3)=3 is also written; however, since the pattern is already labeled 7 on segment in FIG. 12, a processing for unification of the labels is carried out. In the processing $\alpha=3$, $\beta=7$ and D(3)=3, therefore $\alpha_0=\alpha=3$. However, D(7)=2 to $\beta=7$ from FIG. 11; therefore, D(2) is checked consecutively as described in FIG. 10 and D(2)=2 (FIG. 11), so that $\beta_0=2$. Consequently, 2 of $\alpha_0$, $\beta_0$, whichever is smaller is assigned to the pattern in which the specific point 3 is found as a label, and D(3) of the connectivity table T is also assigned at 2. The table T in this case becomes at last as shown in FIG. 13. Assuming that detection continues and proceeds downward and a specific point 4 is found as shown in FIG. 14, processing is performed in this case by exactly the same regulation as in the case of FIG. 12 obtained from FIG. 8, where the specific point 2 was found. A label for the pattern in which the specific point 4 was found and a value D(4) of the connectivity table T are both given at 1. FIG. 15 becomes at last the connectivity table T in this case. Then, specific points 5, 6 are found as shown in FIG. 16, however, processing in this case is exactly the same as in the case of the specific point 1, the patterns are labeled 5, 6, and D(5)=5, D(6)=6 (FIG. 17) in the connectivity table T. Let it be assumed that detection is furthered, and the pattern of the label 5 and a pattern of the label 6 join each other. In this case, two labels $\alpha=5$, $\beta=6$ also appear on one pattern, therefore $\alpha_0=5$, $\beta_0=6$ are obtained through the method described in FIG. 10, the label 5 of those whichever smaller is given to the pattern having joined as mentioned and rewritten as D(6)=5 (FIG. 19).

The connectivity table T of FIG. 19 which is obtained as above, and corresponding to the patterns of FIG. 2 indicates that if D(I)=D(J), an arbitrary pair of specific points I and J are concatenated, but if D(I)≠D(J) they are not concatenated.

<LABELING>

As described above, a label is assigned to a detected pattern, and the label is further rewritten to a normal processing, which is represented on the drawings, and a specific method for labeling the pattern will now be described.

Figures 20, 21, 22, 23:
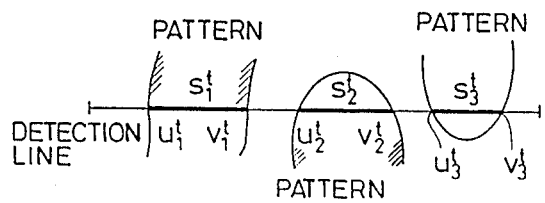
FIG. 20 and FIG. 21 are drawings illustrating a one-dimensional detecting method relating to the connectivity detection.
FIG. 22 and FIG. 23 are explanatory drawings of a flag for saving the information by storing it in the memory.

Let it be assumed now that a binary picture image for one line which is detected on a linear sensor or the like at a scanning time t is as shown in FIG. 20. In the drawing, a pattern portion is given as a level 1 in binary logic at the thick line, and lines of intersection (thick lines) with the detection line are called segments $S_1^t$, $S_2^t$, $S_3^t$ from left to right in that order. Further, from giving coordinates of start points of the segments as $u_1^t < u_2^t < \ldots$ and those of end points as $v_1^t < v_2^t < \ldots$, since these can be detected, a line table LT1 having a leading address APi corresponding to each segment can be prepared as shown in FIG. 21. Further, 0 (virtual label) is set as an initial value in a label field of the table LT1, and, for example, if the specific point (the coordinate being input externally beforehand and given as a pad position on table memory 10) is found on a segment $S_i^t$ at the time of scanning, the pad number N is written in a label $L_i^t$ of the segment. It is evident that D(N) of the connectivity table T is also given as N at all times in this case as described hereinabove. Other labeling, rewriting and the like may be effected all in the label field on the line table LT1, however, such a line table is prepared line by line at each scann, therefore storing these all separately would require vast memory capacity. In the embodiment, therefore, only a memory for two lines of the line table LT1 created at the time t and a line table LT0 created at a time t−1 are used. The line table LT0 is also similar in construction to the table LT1 of FIG. 21, and where the segments are $S_1^{t-1}$, $S_2^{t-1}$, ..., the start points are $u_1^{t-1} < u_2^{t-1} < \ldots$, the end points are $v_1^{t-1} < v_2^{t-1} < \ldots$, and the labels are $L_1^{t-1}$, $L_2^{t-1}$ ..., the requirement for each segment $S_i^{t-1}$ and $S_j^t$ of the line tables LT0, LT1 to be included in the same pattern will be met by a presence of overlap when both segments are written on the same line, which may be represented apparently by:

$$v_j^t \geq u_i^{t-1} \text{ and } v_i^{t-1} \geq u_j^t \quad (1)$$

Accordingly, processing described in FIG. 3 to FIG. 19 are carried out sequentially on all sets of the segments $S_i^{t-1}$, $s_j^t$ satisfying the expression (1) for these coming on the same pattern with reference to the line tables LT0, LT1, and when these are over, a content of the line table LT1 is transferred straight to the line table LT0, a scanning of the line at the next time t+1 ensues to update the content of the line table LT1, and the above-mentioned processing is then repeated. Thus, a memory control for pattern labeling will be achieved simply by preparing the line tables LT0, LT1 for two lines, and a small memory capacity is ready for working. Further, a data area for the number of pads must be secured for detecting connectivity between pads, so that the connectivity table T of the embodiment is arranged so as to cope therewith, however, a portion coordinated with a working temporary label, namely an extra data area of the temporary label when a pattern branches is also necessary. This may be necessary with the number dealing with the branch, and as compared with the conventional method of labeling all independent patterns on the detected image, a relatively small memory capacity will be available as a whole for the invention wherein specific points are inspected.

Then, if the number of branch patterns exceeds that which was originally present, so that a table for temporary labels becomes short, the following method is effective for restoration. That is, 1-bit flag is provided in area of the temporary number of the connectivity table T. The flags are all initialized to 0 during the state prior to starting the processing. When these are used one by one at the time of detecting the branch as shown in FIG. 4, a coordinated flag remains set to 1 to indicate the temporary number that is currently used. FIG. 22 shows an example of the connectivity table T having such flags, indicating the case where temporary numbers 5 to 8 have all been used. Where another branch arises which requires a temporary label in that state, the connectivity table T is searched first, the processing of FIG. 10 is executed to each tentative number J with J=α, and wherein the end result $α_0$ obtained, it is applied as a value of D(J). When I=5 to 8 in FIG. 22 is executed, $α_0 = 5$ is obtained for all values of I, and a data field of the connectivity table T is rewritten as shown in FIG. 23. Then, the label field to segments of the line tables LT0, LT1 having temporary numbers of the connectivity table T thus obtained is rewritten to labels of the connectivity table T just rewritten. For example, if the label of a segment of the line table LT0 or LT1 is 6, it is then rewritten to 5 as the result of FIG. 22. Next, labels of the two line tables LT0, LT1 thus processed are searched, and temporary labels (5 to 8 here) are found. Then, "1" is assigned to flag of the temporary label (being 5 here) thus found and "0" is assigned to other flags. The result is shown in the flag field of FIG. 23.

The number of temporary labels in use is decreased to 1 from 4 according to the above processing, and a new label can be given by selecting the temporary label with a flag 0. The above processing signifies that temporary labels (6 to 8 in the above example) of those which are given in the area having been processed already which are not related to the ensuing processing can be reused.

<EPTIOME OF CONSTRUCTION AND OPERATION OF THE APPARATUS>

Now, the connectivity detecting apparatus according to this invention will be described specifically. FIG. 1 represents a general construction given in one example. Detailed descriptions of the preferred embodiments and the operation thereof will now be described.

A serial binary picture signal from a picture detector, or a linear sensor for example, is stored temporarily in the line buffer memories 3A, 3B through the picture input part 1, and a switching circuit 2 alternately and in line unit. Table 1 shows an operation of the switching circuit 2, namely, to which line buffer memory 3A or 3B the binary picture signal is input from the picture input part, and from which the binary picture signal is read out, in the relation with a line position.

TABLE 1

| Line (i = 1,2, ...) | Binary picture signal inputted to: | Input of code conversion part |
|---|---|---|
| 2i-1-th | Line buffer memory 1 | Line buffer memory 0 |
| 2i-th | Line buffer memory 0 | Line buffer memory 1 |

As will be apparent from TABLE 1, the binary picture signal one line before is serially read by the code conversion part 4 alternately from the buffer memories 3A, 3B through the switching circuit 2, and segments on the line, addresses (coordinate positions) of start point and end point thereof are detected from the binary picture signal. That is, with the address corresponding to the binary picture signal which changes from 0 to 1 as a starting address of the segment, the address where the signal changes from 1 to 0 for the first time thereafter as an end address, and the segment, realized by the addresses of the start point and end point thereof, are detected in the code conversion part 4. The segment-coordinated starting address and end address are paired and are written sequentially in a temporary storage FIFO (First-In First-Out) 5 whenever the segment is detected, however; the starting address and the end address are read as a pair to the pad number assigner part 6 on first-in first-out mode from FIFO 5. Whether a specific point is present on the segment specified by the start point address and the end point address is detected at the pad number assigner part 6, the configuration is such that the presence of the specific point is detected with reference to a specific point position coordinate from a pad position table memory 10 through an access control circuit 9. When the specific point present is detected, the segment is labeled, and the label has both the start point address and end point address written in any one of the line table memories 8A to 8C through the switching circuit 7. TABLE 2 shows an operation of the switching circuit 7, namely, to which line table memory of the line table memories 8A to 8C an output of the pad number assigner part 6 is input according to the line position, and further that which is outputted from the line table memories 8A to 8C is input to the labeling part 14.

TABLE 2

| Line<br>(i = 1,2, ...) | Pad number<br>assigner part<br>output to: | Input of labeling<br>part | | |
|---|---|---|---|---|
| 3i-2-th | Line table<br>memory 2 | Line table<br>memory 1 | Line table<br>memory 0 | |
| 3i-1-th | Line table<br>memory 0 | Line table<br>memory 2 | Line table<br>memory 1 | |
| 3i-th | Line table<br>memory 1 | Line table<br>memory 0 | Line table<br>memory 2 | |

As will be apparent from the above table, in the case, for example, an output of the pad number assigner part 6 is actually input to the line table memory 8A, outputs 1 line before and 2 lines before of the pad number assigner part 6 are read from the line table memories 8B, 8C to the labeling part 14. The relationship between the superimposed segments present on the two lines is detected at the labeling part 14 according to the expression (1) given hereinabove, a label is then assigned to the segment, and the content of the connectivity table memory is updated, as described, through an access control circuit 13. Then, a flag memory 15 indicates on opearting state of the temporary label on the connectivity table memory 12, and the interface circuit 11 outputs a content of the connectivity table memory 12 externally and also inputs a grid position coordinate to the pad position table memory 10.

The construction and the operation are epitomized as above, which will further be described as follows:

<INITIALIZATION>

Prior to starting a process, specific point position coordinates $(x_i, y_i)$ and a pad number $N_i$ corresponding thereto are input to the pad position table memory 10 through the interface circuit 11. FIG. 24 shows the storing format of the specific point position coordinates $(x_i, y_i)$ on the pad position table memory 10 and the grid number $N_i$. In this case, the order in which data is written into the pad position table memory 10 is $y_1 \leq y_2 \leq \ldots \leq y_i \leq y_{i+1} \ldots$, and $\ldots < x_i < x_{i+} < \ldots$ for the same $y_i$. That is, the data of the specific point position is sorted in the order of picture detection. Next, the line buffer memories 3A, 3B (FIG. 1), the connectivity table memory 12, the flag memory 15, the switching circuits 2, 7 and the line table memories 8A to 8C are initialized, and further the number of lines according to the size of a processing area is set to the labeling part 14 externally through the interface circuit 11. A processing is started after the above initialization.

<PARALLEL PROCESSING>

In accordance with a process start, a binary picture signal is input alternately to the two line buffer memories 3A, 3B as shown in TABLE 1, and the code conversion part 4 operates to detect a segment and addresses its start and end with the content of the line buffer memory to which a picture image is not input currently as an input. Then, in parallel with the above processings, the start point and end point addresses of the segment and the label are input cyclically to one of the three line table memories 8A to 8C from the pad number assigner part 6 as shown in TABLE 2, and the labeling part 14 operates for labeling with a content of the remaining two line buffer memories as an input. Accordingly, if the code conversion part 4 and the pad number assigner part 6 operate for the t-th line processing, then the picture input operates to the t+1-th line and the labeling part 14 operates to the t−2-th line. Thus, the above-mentioned three operations can be realized in parallel perfectly without being subjected to interference by changing the switching circuits 2, 7 at every boundary line of the input picture image, thereby ensuring high-speed processing. Then, since FIFO is provided between the code conversion part 4 and the pad number assigner part 6, code conversion and grid number assignment can be realized nonsynchronously and parallel in part, so that these portions can be processed at high speed. It is evident that, buffer memories 17A, 17B and a switching circuit 16 can be provided instead of FIFO as shown in FIG. 25, and from effecting input and output operations alternately as in the case of line buffer memories 3A, 3B, a perfect parallel processing of the code conversion part 4 and the pad number assigner part 6 can be realized. In this case, if the pad number assigner part 6 is in processing of the t-th line, then the picture input part 1, the code conversion part 4 and the labeling part 14 will be in processing of the t+2-th, t+1-th, t−1-th and t−2-th lines respectively.

<RATE DETERMINING PROCESS>

A processing rate of the apparatus according to this invention is determined on the portion for which processing time is most required of those which operate in parallel with each other like the picture input part 1, the code conversion part 4, the pad number assigner part 6, the labeling part 14. Then, the picture input part 1 of those which are mentioned above is operable for real-time input at a specific rate determined only on a speed of the line buffer memories 3A, 3B and a speed of a peripheral circuit such as switching circuit 2 or the like.

In the case of code conversion part 4, pad number assigner part 6, and lableing part 14, the processing time varies according to a complexity of the input binary picture pattern. As will be described later, processing is particularly complicated for labeling part 14 as compared with the code conversion part 4 and the pad number assigner part 6, therefore from interposing FIFO between the code conversion part 4 and the pad number assigner part 6 instead of buffer memories, the processing time per line at the portions will never be longer than the processing time per line at the labeling part 14 even if this processing is not carried out exactly in parallel. The matter on interposing FIFO of buffer memories selectively between the code conversion part 4 and the pad number assigner part 6 may depend on how to accelerate processing on the labeling part 14, which must be determined by simulation after specific circuit design.

<COLLISION AVOIDANCE>

As will be described hereinlater, the labeling part 14 and the pad number assigner part 6 are capable of writing or reading concurrently to the same connectivity table memory 12. Consequently, collisions will be avoided by the access control circuit 13. The controlling process is shown in FIG. 26. That is, periods of accessible time from the labeling part 14 and the pad number assigner part 6 are provided alternately. In this case, it is necessary to design $\tau$ in FIG. 26 or a circuit so that the sum of access time of the connection table memory 12 and delay time of the peripheral circuit will be shorter than $\tau$. This method is one of known memory access methods, however, a comparatively simple circuit configuration is effective enough to realize access control according to the method. Needless to say, and other methods known hitherto can be used otherwise.

<CONSTRUCTION OF EACH PART>

Next, construction and operation of the picture input part 1, the code conversion part 4, the pad number assigner part 6, and the lableing part 14 will be described in detail.

Figure 27:
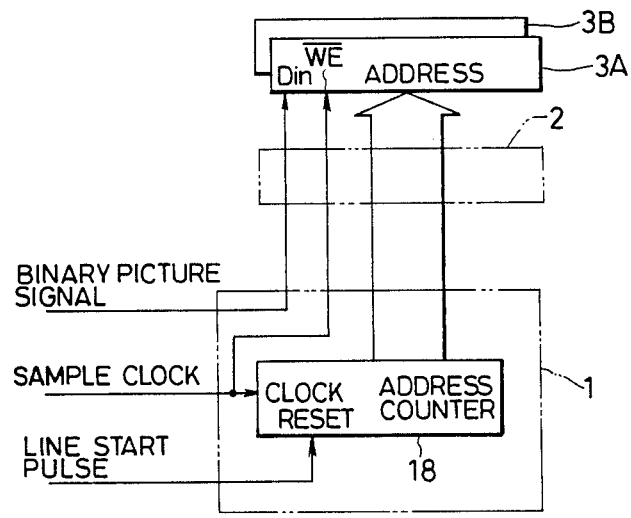

Referring to the picture input part, first of all, FIG. 27 shows an example representing the construction. It comprises an address counter 18 as illustrated, a sample clock pulse of the binary picture signal is input as a clock pulse for the address counter 18, and a line beginning pulse of the linear sensor which is input at regular intervals is made to work as a reset signal for the address counter 18, thereby generating a data input address of the line buffer memories 3A, 3B. The $\overline{WE}$ signal (write enable signal) of the line buffer memories 3A, 3B is created from the sample clock pulse. The address signal thus created, the $\overline{WE}$ signal and the binary picture signal are input either to line buffer memory 3A or to 3B through the switching circuit 2.

Figure 28:
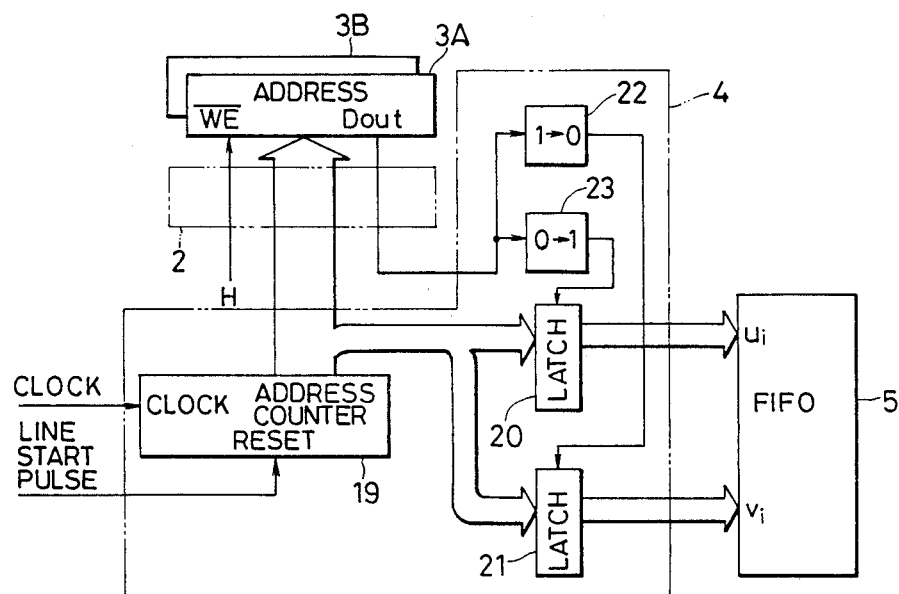

FIG. 28 shows one example of construction of the code conversion part. As in the case of the picture input part, a clock pulse is input to an address counter 19, and an address of the line buffer memories 3A, 3B is generated, however, the clock pulse is not necessarily identified by the sample clock pulse in FIG. 27, and a shorter pulse (high frequency) can be used accordingly. The address signal is input to the one line buffer memory selected through the switching circuit 2, and from turning the $\overline{WE}$ signal of the selected line buffer memory to H (high level status), a binary picture signal input one cycle before the line beginning pulse is output from Dout. A rise (0→1) and a fall (1→0) of the signal are detected by a rise detection circuit 23 and a fall detection circuit 22 respectively, a starting address $u_i$ and an end address $v_i$ are obtainable through latching a value of the address counter 19; however, these are written in FIFO 5 as a pair.

Figure 29:
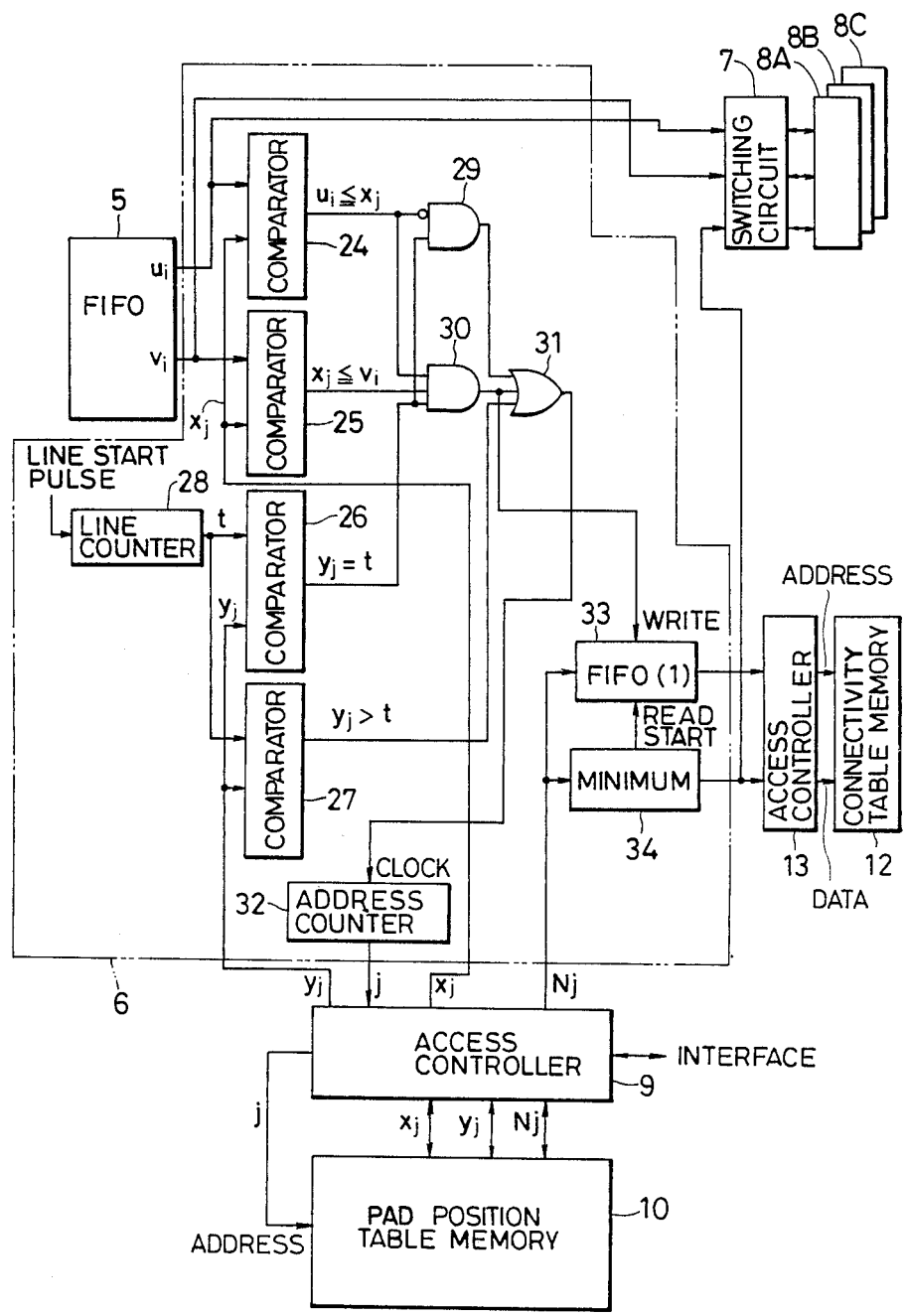

FIG. 29 shows one example of construction of the pad number assigner part. The starting address $u_i$ and the end point address $v_i$ of a segment read out of FIFO 5 are compared with $x_j$ of data of the address indicated from the access controller 9 of the pad position table memory 10 on comparators 24, 25, and then a line counter 28 indicates which order of line is currently processed, it is compared with data $y_j$ from the pad position table memory 10 via access controller 9, on a comparator 26. The line counter 28 is initialized at the beginning of detection and incremented up (or decremented) whenever the line beginning pulse is input. When $u_i \leq x_j \leq v_i$ and $y_j = t$ as the result of comparison, the effect is detected by an AND gate 30, however, the detection output records a pads number $N_j$ to FIFO (1) 33 through an OR gate 31. The count of the address counter 32 of the pads position table memory 10 is thus incremented simultaneously, and the next $x_{j+1}$, $y_{j+1}$, $N_{j+1}$ are read out. In this case, if also $u_i \leq x_{j+1} \leq v_i$ and $y_{j+1} = t$, $N_{j+1}$ is recorded to FIFO (1) 33. When the above-mentioned comparison does not hold good from repeating such processing, $u_i$, $v_i$ are written in the predetermined line table memory with the minimum value min $N_j$ of $N_j$ inputted to FIFO (1) 33 as a label. Then, min $N_j$ is written in the connectivity table memory 12 with $N_j$ written in FIFO (1) as an address, thus leaving FIFO (1) empty. If there is not specific point to hold the above-mentioned relation good to $u_i$, $v_i$, then $u_i$, $v_i$ are written in the line table memory with a temporary label 0 given thereto. Then, the minimum value min $N_i$ is detected by a minimum value detection circuit 34. When all specific points presents on one segment are detected, as well as the minimum value min $N_i$, $N_j$ is read out of FIFO (1) 33 sequentially for the first time.

Meanwhile, when $y_j > t$ and $y_j = t$ and $v_i < x_j$ proceed to the case mentioned above, the address counter 32 is incremented. A comparator 27, a one input NOT-AND gate 29 are provided for detecting the above-mentioned cases. A new specific point position and pad number are obtainable through the pad position table memory 10 whenever the address counter 32 is counted up.

Now, when $u_i$, $v_i$ and the label of one segment are written in the line table memory, $u_i$, $v_i$ of the next segment, they are read out of FIFO 5, and similar processing as above is carried out.

FIG. 30 represents a schematic construction of the labeling part. The labelinig part reads the starting and end addresses $(u_i{}^{t-1}, v_i{}^{t-1})$, $(u_j{}^{t-2}, v_j{}^{t-2})$ of segments $S_i{}^{t-1}$, $S_j{}^{t-2}$ from the two line table selected by the switching circuit, and then detects the segment satisfying the expression (2).

$$u_i{}^{t-1} \leq v_j{}^{t-2} \text{ and } u_j{}^{t-2} \leq v_i{}^{t-1} \quad (2).$$

Such segments $S_i{}^{t-1}$, $S_j{}^{t-2}$ will now be called connected segments. Let it be assumed that the segments $S_j{}^{t-2}$ and $S_i{}^{t-1}$ are connected are labeled as $L_0$, $L_1$, respectively, and in which the following processing is carried out according to a value of $(L_0, L_1)$:

(1) Where $L_0 = 0$ and $L_1 = 0$ (1A) When the segment $S_j{}^{t-1}$ connected with the segment $S_j{}^{t-2}$ numbers 2 or more, and labels of these $Si^{t-1}$ are all 0, one J of temporary labels with the connectivity table memory flag 0 is selected to $L_1=L_0=J$. Then, the flag is made to be 1 with the data on address A(J) as J. This processing corresponds the time of a branch occurrence as shown in FIG. 4.

(1B) Nothing will be done when the above condition (1A) is not satisfied. That is, the specific point is not yet found, and a branch does not arise, therefore the temporary label 0 is left as it is.

(2) Where $L_0 \neq 0$ and $L_1 \neq 0$:

The processing will be carried out so when two labels are assigned to an identical pattern, and first $\alpha_0$ obtained through carrying out the processing shown in FIG. 12, with $L_0 = \alpha$ being represented by $M_0$, $\alpha_0$ obtained likewise with $L_1 = \alpha$ is represented by $M_1$, then $M = \min (M_0, M_1)$ is obtained (where temporary number>pad number>temporary label; "min" being replaced by "max" from the symbols coming in<all), and $L_0 = L_1 = M$ on the line table memory. Rewritten as D $(M_0) = D (M_1) = M$ on the table T, too. Thus, only the minimum pad number M is assigned to the identical pattern at all times.

(3) Where only one of $L_0$, $L_1$ is 0:

First, if a label other than 0 is L, the processing shown in FIG. 12 is carried out at $L = \alpha$, and $L_0 = L_1 = M$ when $\alpha_0$ thus obtained is represented by M. The same label is thus assigned to a segment connected with the segment labeled other than 0.

Then, a data structure of the connectivity table memory is similar to that of the connectivity table T shown in FIG. 22 or FIG. 23.

The above processing is carried out repeatedly for all segments on the two line table memories. When the processing for all segments on either one line table memory is complete, procesing for the line comes to an end. Processing on the labeling part is relatively complex; therefore, only a comparison decision through the expression (2) and a branch of the above-mentioned conditions are carried out on hardware, and other processing is subjected to a microprogram control on a bit slice microprocessor. Of course, a configuration based entirely on hardware is acceptable.

Now, when processing for the number of set lines is over, the content of the connectivity table memory 12 is output externally through the access control circuit 13 and the interface circuit 11; however, a plurality of points specified externally are connected through patterns can be detected.

According to the connectivity detecting aspect of the invention, a connectivity of a pattern is found by renumbering and, scanning the pattern one-dimensionally. Therefore a memory capacity of the connectivity table memory can be reasonably minimized, thus coping effectively with the requirement for high-speed processing.

(B) Detection of Pattern Defects:

Pattern defects can be detected in hardware operating actually through effectively using the connectivity detecting method and apparatus described hereinabove. Here, examples of some pattern defect detecting apparatus are disclosed according to a required detection level, and the construction of each part is described accordingly. Further, for easy understanding of how the effect ensured by each example will be realized, connectivity data, a design data and a cyclic list are first described.

Figure 37:
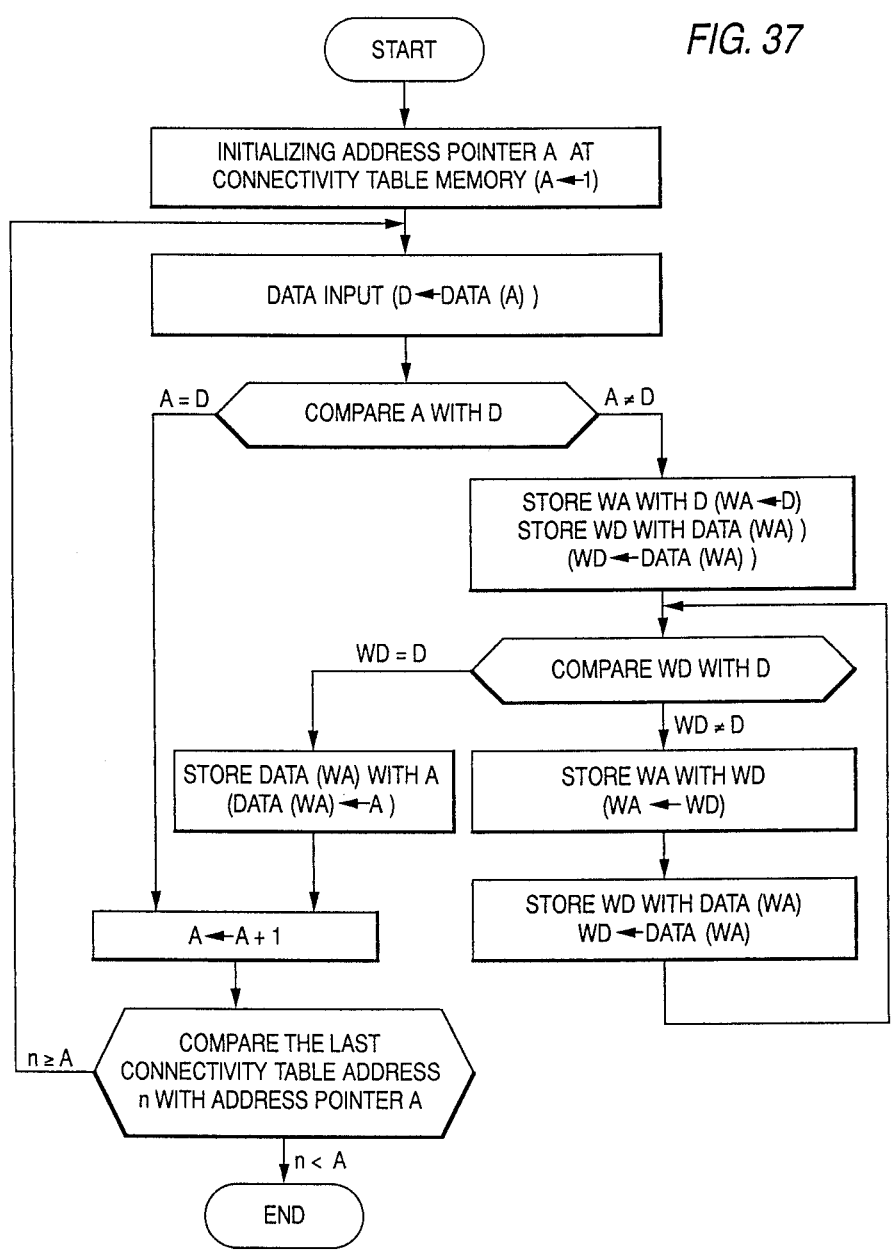
FIG. 37 is a flowchart for transforming the connectivity data into a cyclic list structure.

For detecting defects in electric conduction of a circuit pattern without touch, it is convenient that a conductor portion is detected photoelectrically and separated and extracted as a binary-coded pattern. Then, the pattern defect detecting art relating to this invention is standardized to carry out inspections by mutually comparing data (hereinafter called connectivity data) obtained through applying the connectivity detecting art described hereinabove, namely, an art for labeling one pattern with plural numbers and detecting a connectivity between two arbitrary specific points on the said pattern (hereinafter simply called "connectivity processing") for binary coding with data (hereinafter called design data) obtained through applying a connectivity processing beforehand to a pattern to be inspected which is free from defects and transforming the connectivity data to a cyclic list structure. Referring to the design data, a correct reference connectivity can be created practically by modifying the connectivity data obtained from a pattern non-including defects. The design data will be created as described hereinlater (FIG. 37).

The connectivity data is taken up for description, first. The connectivity data is easily obtained from the connectivities detected by the connectivity processor shown in FIG. 1. Its addresses imply pad numbers to be considered for the inspection, and its data specifies the root pad number of the pattern in which the pad locates. A root pad represents a connected circuit pattern and its number is the smallest pad number assigned in the pattern. Here, the pad number refers to a number given to a pad for which continuity and others must be inspected on the circuit pattern according to a specific regulation (FIG. 35). The root pad refers to specific one pad representing each connected circuit pattern. For determining the root pad, a specific base will be fixed such that, for example, the root pad has the smallest (or largest) pad number located in a connected circuit pattern the circuit patterns are numbered uniformly by turns from left to right vertically. The connectivity data coordinated with the pattern of FIG. 36 is shown in TABLE 3. In the drawing, the root pad comes in those with pad numbers 1 and 4.

The design data has a so-called cyclic list data structure: starting with an address, visiting a next address which is equal to a data of the previous address and repeating the same procedure, then we return to the first address (TABLE 4). The individual cyclic list indicates the pad numbers, set on one connected circuit pattern and is not to indicate a geometric positional relation between the pads. The design data coordinated with the pattern of FIG. 36 is shown in TABLE 4.

TABLE 3

| Address | Root pad |
| --- | --- |
| 1 | 1 |
| 2 | 1 |
| 3 | 1 |
| 4 | 4 |
| 5 | 4 |

TABLE 4

| Address | Pad number |
| --- | --- |
| 1 | 2 |
| 2 | 3 |
| 3 | 1 |
| 4 | 5 |
| 5 | 4 |

Next described is a method for transforming the untransformed design data into a cyclic list structure. The connectivity data will be taken up, by way of example, for description. The connectivity data will be stored in a data table at addresses 1 to n. The content is rewritten to obtain the cyclic list according to a procedure of the flowchart shown in FIG. 37. Here, Y←DATA(X) means to read out data of an X-indicating position in a connectivity table memory and to input the data to Y.

The design data thus obtained may be functional as a base for mutually comparing with the connectivity data, however, the design data further has a 2-bit memory for storing intermediate data for comparison as attribute data added to each address. A decision procedure of the attribute data which is intermediate data is given as follows:

Stage 1: Attribute data are all cleared to 0.

Stage 2: All connectivity data are compared with the design data under the following procedure, and a result is stored in the attribute data. If the left and right numbers of the connectivity data are equal, the attribute data=1, but if not, then the right number (root pad number) of the connectivity data is checked for presence on the design data by making a round of the cyclic list on the design data. If present, the attribute data=2, but if not, then the attribute data=3.

Stage 3: The attribute data of an individual cyclic list in the design center is checked, and a defect of the connectivity data is decided according to the standard shown below.

Case 1: Where one or more zeroes are present:
→Something is wrong with the pad (no pad)

Case 2: Where a 1 is present one and all others are 2:

→Normal

Case 3: Where two or more 1's are present:

→Disconnected

Case 4: Where one or more 3's are present:

→Short-circuited

Stage 4: Decision result on defects of each cyclic list (about connected sets of circuit patterns) is output.

The above will be described according to examples with reference to the accompanying drawings, however, it is to be understood that various changes and modifications may be made without departing from the spirit and scope of this invention.

<FIRST EMBODIMENT>

The most basic embodiment of the pattern defect inspecting art relating to this invention will be described according to FIG. 38.

Figure 34:
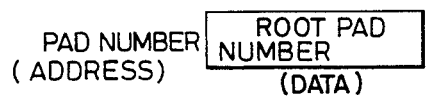
FIG. 34 is an explanatory drawing of a connectivity data structure.

First, an optical image of a pattern to be inspected is converted into an electrical signal on a pickup device 21. A two-dimensional picture pickup device such as TV camera or the like may be used for the pickup device 21, or a pickup device for which a linear sensor and a one-way driving mechanism are combined may be used therefor. The electrical signal is converted into a binary signal (binary pattern) through the binary-coding device 22. A fixed threshold system may be sued for the binary-coding system, or a floating threshold system and a shading correction means may be used for obtaining stable patterns. The binary signal is input to the connectivity processor 23, and connectivity data shown in FIG. 34 is created thereby.

To know the pad number at the time of connectivity processing, a coordinative relation between a pad position and number is created from interval and number of pads, and then stored in a pad position table memory 10. The design data is read out of the connectivity table memory 12, transformed into a cyclic list structure according to the method described hereinbefore, and stored in a design data memory 26.

Then, after all the circuit patterns are imaged on the pickup device, the connectivity data of all the circuit patterns to be inspected is created, a defect detecting algorithm described hereinbefore is carried out on the processor 25, and the attribute data judged to be defective is output to the attribute data memory 28.

Figure 40:
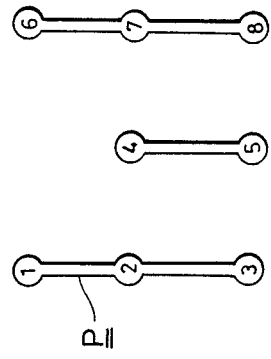
FIG. 40 is a plan view of a normal pattern corresponding to the pattern to be inspected which is shown in FIG. 39.
Figure 39:
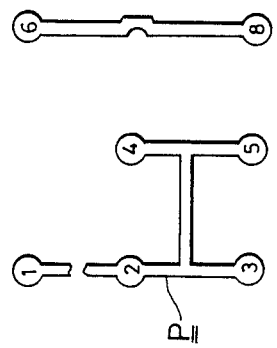
FIG. 39 is a plan view of one example of a pattern to be inspected.

An actual defect detection process will be described with reference to the pattern to be inspected which is shown in FIG. 39. A content of the connectivity table stored in the connection data memory 12 through binary coding and connectivity processing is shown in TABLE 5. The root pad being 0 indicates that a pad corresponding to the address number is not found. On the other hand, the design data obtained from a normal pattern shown in FIG. 40 is shown in TABLE 6. The left column of TABLE 6 indicates an address, the central column indicates a pad number (pointer) and the right column indicates an attribute data. The attribute data is initialized to 0. First, upon checking the first data of the connectivity table memory 12, both the left and right pad numbers are 1, therefore the attribute data of address 1 of the design data is numbered 1. Then, both the left and right pad numbers of the next connectivity data are also 2, therefore the attribute data of address 2 of the design data is numbered 1.

The next connectivity data has the left pad number at 3 and the root pad number at 2. First, a data (pointer) of address 3 of the design data is 1, which is not coincident with the root pad number 2. Now, therefore, a data of address 1 indicated by the pointer is checked. The data is numbered 2 and coincident with the root pad number, therefore the attribute data of address 3 is numbered 2.

TABLE 5

| Address | Root pad |
|---|---|
| 1 | 1 |
| 2 | 2 |
| 3 | 2 |
| 4 | 2 |
| 5 | 2 |
| 6 | 6 |
| 7 | 0 |
| 8 | 6 |

TABLE 6

| Address | Pad number | Attribute data |
|---|---|---|
| 1 | 2 | 1 |
| 2 | 3 | 1 |
| 3 | 1 | 2 |
| 4 | 5 | 3 |
| 5 | 4 | 3 |
| 6 | 7 | 1 |
| 7 | 8 | 0 |
| 8 | 6 | 2 |

The left pad number of the next connectivity data is 4, and the root pad number is 2. The data of address 4 of the design data is checked to be 5, which is not coincident with the root pad number 2. Therefore, upon checking the data of address 5, it is numbered 4, which is not coincident with the parental pad number 2 but coincident with the left pad number 4 of the connectivity data, and thus the situation is such that the root pad has not been found from making a round of the cyclic list. Consequently, the attribute data of address 4 is numbered 3. With reference to the next connectivity data, the situation is such that the root pad cannot be found likewise from making a round of the cyclic list, therefore the attribute data of address 5 is numbered 3.

The next connectivity data has the left pad number at 6 and the root pad number at 6, therefore the attribute data of address 6 is numbered 1. Then, the next connectivity data has the left pad number at 8, the root pad number at 6, and the data of address 8 of the design data is checked to be 6, therefore the attribute data of address 8 is numbered 2. A search of all the connectivity data in this case is finshed as above, and thus the attribute data have been created.

Now, the attribute data are checked at each cyclic list at this time, thereby judging whether a defect is present. First, the pattern comprising pad numbers 1, 2, 3 has two 1 in the attribute data, therefore it is decided to be disconnected. Next, the pattern comprising pad numbers 4, 5 has the attribute data numbered 3, therefore it is decided to be short-circuited. Then, the pattern comprising pad numbers 6, 7, 8 has 0 in the attribute data, therefore a defect "no pad" in pad number 7.

Thus, the judgment indicates defects on the pattern correctly. However, one of the short-circuited patterns does not come out on the judgment. It cannot be a serious defect nevertheless.

As described, according to this embodiment, patterns can be detected for short circuit and disconnection without touch through a relatively simple configuration.

<SECOND EMBODIMENT>

A second embodiment according to the invention will be described next. A construction of the system for putting the embodiment into practice is shown in FIG. 41. What is different from the foregoing embodiment (FIG. 38) is that a contraction processor 29 is inserted between the binary-coding device 22 and the connectivity processor 23, and other construction remains exactly the same.

One example of the contraction processor 29 is shown in FIG. 42. The processor comprises n-bit shift register 31 in ($m_2-1$) pieces and $m_1$-bit shift register 32 in $m_2$ pieces. These shift registers are driven by the identical sampling clock. The n is made to coincide with a horizontal sampling number of the pickup device 21. Then, $m_1$, $m_2$ are determined by sampling time interval, vertical resolution of the pickup device and size of a defect to be detected. If, for example, the sampling time interval and the vertical resolution correspond to 10 $\mu$m each and the size of a defect is 30 $\mu$m square, then $m_1=m_2=3$ (FIG. 43). Then, an output of the $m_1 \times m_2$ shift register 32 (FIG. 42) is led to AND circuit 33 and output to the connectivity processor 23 (FIG. 41). In FIG. 42, outputs of all the shift registers are extracted, however, they can be extracted selectively according to a shape of the defect to be detected. A result obtained through subjecting the binary pattern shown in FIG. 43 to a contraction processing on the system of FIG. 42 is shown in FIG. 44. A square with the shortest segment as one side represents one picture element.

Figure 45:
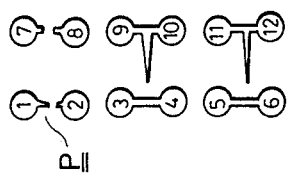
FIG. 45 is a plan view of another example of the pattern to be inspected.
Figure 46:
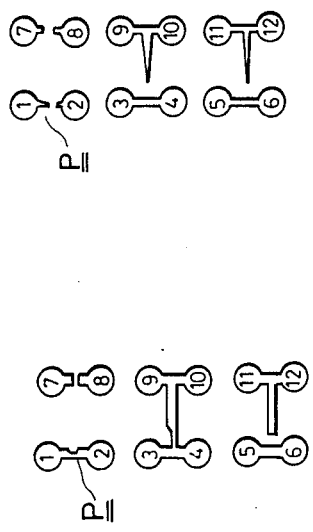
FIG. 46 is a plan view of a pattern obtainable through applying a contraction to the pattern shown in FIG. 45.

The pattern obtained as a result of subjecting a pattern to be inspected, which is shown in FIG. 45, to a contraction processing is shown in FIG. 46, a connectivity data created through connectivity processing is shown in TABLE 7, and a design data is shown in TABLE 8. Further, an attribute data created similarly to the foregoing first embodiment and a defect decision result are shown in the right column of TABLE 8. As will be apparent from the result, a pattern width at a specified value (30 $\mu$m in the example) or below can be dected as a disconnection. However, disconnection cannot be distinguished from a small pattern width, and a fine short circuit is capable of being missed. As described, according to this embodiment, a pattern defect detecting apparatus can be realized through a relatively simple construction only for detecting disconnection and small pattern width without distinction.

TABLE 7

| Address | Root pad |
|---------|----------|
| 1 | 1 |
| 2 | 2 |
| 3 | 3 |
| 4 | 3 |
| 5 | 5 |
| 6 | 5 |
| 7 | 7 |
| 8 | 8 |
| 9 | 9 |
| 10 | 9 |
| 11 | 11 |
| 12 | 11 |

TABLE 8

| Address | Design data | Attribute data | Decision result |
|---------|-------------|----------------|-----------------|
| 1 | 2 | 1 | Disconnected |
| 2 | 1 | 1 | Disconnected |
| 3 | 4 | 1 | Non-defective |
| 4 | 3 | 2 | Non-defective |
| 5 | 6 | 1 | Non-defective |
| 6 | 5 | 2 | Non-defective |
| 7 | 8 | 1 | Disconnected |
| 8 | 7 | 1 | Disconnected |
| 9 | 10 | 1 | Non-defective |
| 10 | 9 | 2 | Non-defective |
| 11 | 12 | 1 | Non-defective |
| 12 | 11 | 2 | Non-defective |

<THIRD EMBODIMENT>

Figure 47:
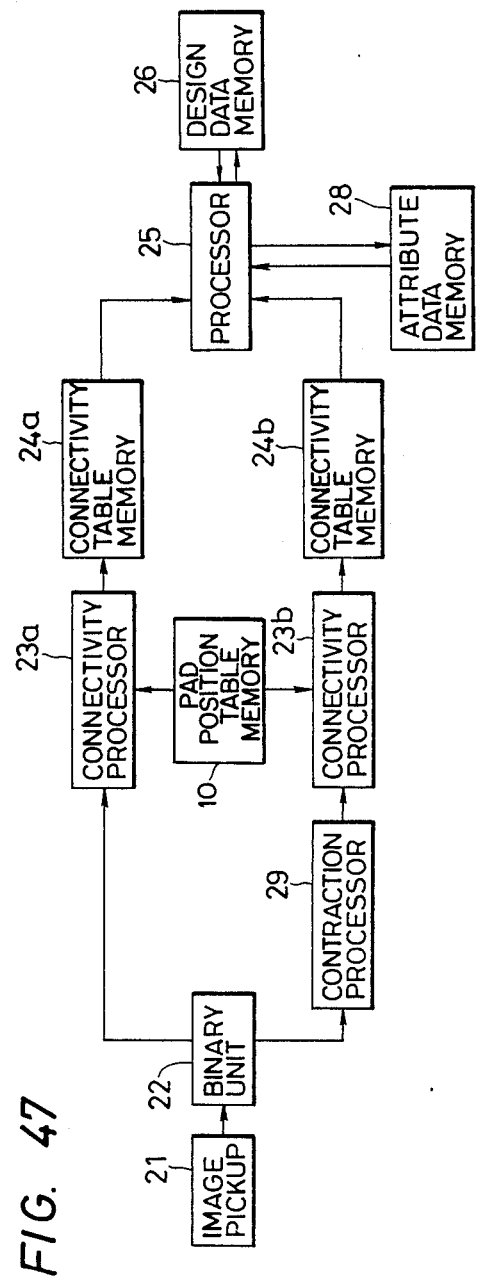
FIG. 47 is a block diagram of a third embodiment of a pattern defect detecting apparatus.

A third embodiment will be described next. A construction of the system for putting the embodiment into practice is shown in FIG. 47. As will be apparent from the drawing, this embodiment combines the first embodiment (FIG. 38) and the second embodiment (FIG. 41). An attribute data detected from the pattern to be inspected shown in FIG. 45, and a defect decision result are shown in TABLE 9 together with the design data.

Figure 38:
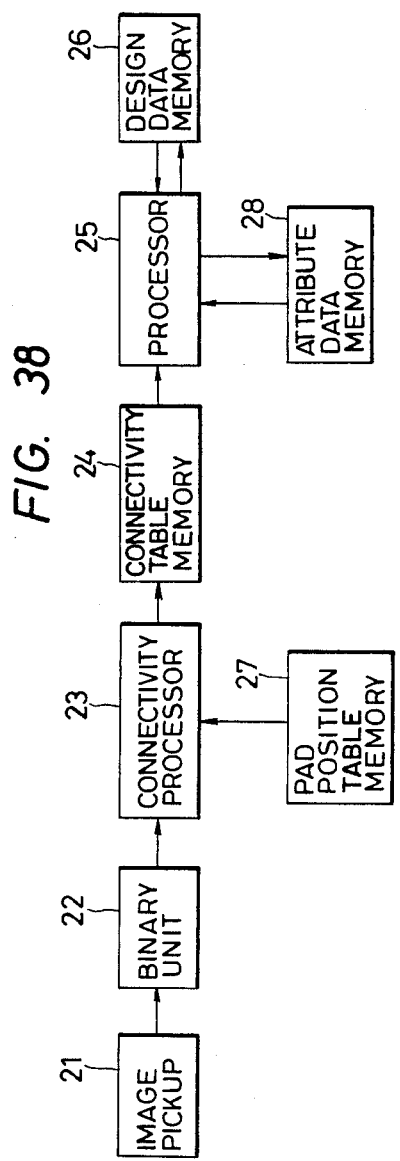
FIG. 38 is a block diagram of a first embodiment of the invention of a pattern defect detecting apparatus.

The system shown in FIG. 47 is that of combining the system shown in FIG. 38 and the system shown in FIG. 41, like parts in each of the figures are identified by the common reference numeral, and "a" attached to each reference numeral indicates belonging to a sequence for processing source pattern, "b" indicates belonging to a sequence for processing contracted pattern. The processing in each sequence is exactly the same as the foregoing two examples, and a processing for synthetically deciding the result obtained from a source pattern and the result obtained from a reduced pattern is added finally. That is, as shown in TABLE 9, disconnection and small pattern width can be distinguished from the two decision results, and a fine short circuit will not be overlooked. According to this embodiment, disconnection and small pattern width can be distinctly detected.

TABLE 9

| Address | Design data | Attribute data - Original pattern | Attribute data - Contracted pattern | Result - Source pattern | Result - Contracted pattern | Decision |
|---|---|---|---|---|---|---|
| 1 | 2 | 1 | 1 | Non-defective | Disconnected | Pattern width small |
| 2 | 1 | 2 | 1 | | | |
| 3 | 4 | 1 | 1 | Non-defective | Non-defective | Non-defective |
| 4 | 3 | 2 | 2 | | | |
| 5 | 6 | 1 | 1 | Non-defective | Non-defective | Non-defective |
| 6 | 5 | 2 | 2 | | | |
| 7 | 8 | 1 | 1 | Disconnected | Disconnected | Disconnected |
| 8 | 7 | 1 | 1 | | | |
| 9 | 10 | 3 | 1 | Short-circuited | Non-defective | Fine short-circuited |
| 10 | 9 | 3 | 2 | | | |
| 11 | 12 | 1 | 1 | Non-defective | Non-defective | Non-defective |
| 12 | 11 | 2 | 2 | | | |

<FOURTH EMBODIMENT>

Next, a fourth embodiment according to the invention will be described. A construction of the system for putting this embodiment into practice is shown in FIG. 48. What is different from the first embodiment (FIG. 38) is that the expansion processor 30 is inserted between the binary-coding device 22 and the connectivity processor 23, and other construction remains exactly the same. One example of the expansion processor 30 is shown in FIG. 49. This processor comprises the n-bit shift register 31 in ($m_2-1$) pieces and the $m_1$-bit shift register 32 in 32 $m_2$ pieces. These shift registers are driven by the identical sampling clock. The n is made to coincide with a horizontal sampling number of the pickup device. Then, $m_1$, $m_2$ are determined by sampling time interval, vertical resolution of the pickup device 21 and size of a defect to be detected. If, for example, the sampling time interval and the vertical resolution correspond to 10 μm each and the size of a defect is 30 μm square, then $m_1=m_2=3$ (FIG. 49). Then, an output of the $m_1 \times m_2$ shift register 32 is led to OR circuit 34 and output to the connectivity processor 23 (FIG. 48). In FIG. 49, outputs of all the shift registers 32 are led to OR circuit 34, however, they can be extracted selectively according to a shape of the defect to be detected. A result obtained through expanding the binary pattern shown in FIG. 43 on the device of FIG. 49 is shown in FIG. 50. Further, a pattern obtained through expanding the pattern to be inspected which is shown in FIG. 45 is shown in FIG. 51, and a connectivity data created through connectivity processing is shown in TABLE 10. In addition, an attribute data created similarly to the first embodiment and a defect decision result are shown in TABLE 11 together with the design data. As will be apparent from the result, a small pattern interval at a specified value (30 μm in the example) or below will be shortened and so detected. However, small short-circuited pattern intervals cannot be detected, and a fine disconnection may be overlooked. As described, according to this embodiment, a pattern defect detecting apparatus can be realized through a relatively simple construction only for detecting a short circuit and a small pattern interval without distinction.

TABLE 10

| Address | Connectivity data |
|---|---|
| 1 | 1 |
| 2 | 1 |
| 3 | 3 |
| 4 | 3 |
| 5 | 5 |
| 6 | 5 |
| 7 | 7 |
| 8 | 7 |
| 9 | 3 |
| 10 | 3 |
| 11 | 5 |
| 12 | 5 |

TABLE 11

| Address | Design data | Attribute data | Decision result |
|---|---|---|---|
| 1 | 2 | 1 | Non-defective |
| 2 | 1 | 2 | Non-defective |
| 3 | 4 | 1 | Non-defective |
| 4 | 3 | 2 | Non-defective |
| 5 | 6 | 1 | Non-defective |
| 6 | 5 | 2 | Non-defective |
| 7 | 8 | 1 | Non-defective |
| 8 | 7 | 2 | Non-defective |
| 9 | 10 | 3 | Short-circuited |
| 10 | 9 | 3 | Short-circuited |
| 11 | 12 | 3 | Short-circuited |
| 12 | 11 | 3 | Short-circuited |

<FIFTH EMBODIMENT>

Next, a fifth embodiment will be described. A construction of the system for putting this embodiment into practice is shown in FIG. 52. As will be apparent from the drawing, the embodiment combines the first embodiment (FIG. 38) and the fourth embodiment (FIG. 48). An attribute data detected from the pattern to be inspected which is shown in FIG. 45 and a defect decision result are shown in TABLE 12. The system shown in FIG. 52 is that for which the system of FIG. 38 and that of FIG. 48 are combined, like parts in each of the figures are identified by the common reference numeral, and "a" attached to the reference numeral indicates belonging to a sequence for processing a source pattern as in the case of FIG. 47, and "c" indicates belonging to a sequence for processing an expanded pattern. The processing in each sequence is exactly the same as the processing in the first and fourth embodiments, however, as in the case of third embodiment, a processing for judging synthetically a decision result obtained from the source pattern and a decision result obtained from the expanded pattern is added finally.

That is, as shown in TABLE 12, a small short-circuited pattern interval can be distinguished according to the two decision results, and also a fine disconnection will not be overlooked. As described, according to this embodiment, a short circuit and a small pattern interval can be detected distinctively.

TABLE 12

| | | Attribute data | | Decision result | | |
|---|---|---|---|---|---|---|
| Address | Design data | Original pattern | Expanded pattern | Original pattern | Expanded pattern | Combined decision |
| 1 | 2 | 1 | 1 | Non-defective | Non-defective | Non-defective |
| 2 | 1 | 2 | 2 | | | |
| 3 | 4 | 1 | 1 | Non-defective | Non-defective | Non-defective |
| 4 | 3 | 2 | 2 | | | |
| 5 | 6 | 1 | 1 | Non-defective | Non-defective | Non-defective |
| 6 | 5 | 2 | 2 | | | |
| 7 | 8 | 1 | 1 | Disconnected | Non-defective | Fine disconnected |
| 8 | 7 | 1 | 2 | | | |
| 9 | 10 | 3 | 3 | Short-circuited | Short-circuited | Short-circuited |
| 10 | 9 | 3 | 3 | | | |
| 11 | 12 | 1 | 3 | Non-defective | Short-circuited | Small pattern interval |
| 12 | 11 | 2 | 3 | | | |

<SIXTH EMBODIMENT>

Next, a sixth embodiment according to the invention will be described. A construction of the system for putting the embodiment into practice is shown in FIG. 53. As will be apparent from the drawing, this embodiment combines the second embodiment (FIG. 41) and the fourth embodiment (FIG. 48). An attribute data detected from the pattern to be inspected shown in FIG. 45, and a defect decision result are shown in TABLE 13 together with the design data. The processing in the embodiment is exactly the same as the second and fourth embodiments. However, a processing for deciding synthetically a decision result obtained from the contracted pattern and a decision result obtained from the expanded pattern is added finally. That is, as shown in TABLE 14, a small pattern interval and a fine short circuit, a small pattern width and a fine disconnection cannot be distinguished from the two decision results, however, others can perfectly be detected distinctively and also not overlooked. Thus, according to the embodiment, perfect short circuit, perfect disconnection, small pattern interval or fine short circuit, small pattern width or fine disconnection can be detected distinctively.

TABLE 13

| | | Attribute data | | Result | | |
|---|---|---|---|---|---|---|
| Address | Design data | Contracted pattern | Expanded pattern | Contracted pattern | Expanded pattern | Decision |
| 1 | 2 | 1 | 1 | Disconnected | Non-defective | Small pattern width; fine disconnection |
| 2 | 1 | 1 | 2 | | | |
| 3 | 4 | 1 | 1 | Non-defective | Non-defective | Non-defective |
| 4 | 3 | 2 | 2 | | | |
| 5 | 6 | 1 | 1 | Non-defective | Non-defective | Non-defective |
| 6 | 5 | 2 | 2 | | | |
| 7 | 8 | 1 | 1 | Disconnected | Non-defective | Small pattern width; fine disconnection |
| 8 | 7 | 1 | 2 | | | |
| 9 | 10 | 1 | 3 | Non-defective | Short-circuited | Small pattern interval; fine short circuit |
| 10 | 9 | 2 | 3 | | | |
| 11 | 12 | 1 | 3 | Non-defective | Short-circuited | Small pattern interval; fine short circuit |
| 12 | 11 | 2 | 3 | | | |

TABLE 14

| Decision result from attribute data | | Decision result |
|---|---|---|
| Contracted pattern | Expanded pattern | (Defect candidate) |
| Non-defective | Non-defective | Non-defective |
| Non-defective | Short-circuited | Small pattern interval or fine short circuit |
| Non-defective | Disconnected | Disabled analysis |
| Short-circuited | Non-defective | Compound defect or disabled analysis |
| Short-circuited | Short-circuited | Short circuit |
| Short-circuited | Disconnected | Disabled analysis |
| Disconnected | Non-defective | Small pattern width or fine disconnection |
| Disconnected | Short-circuited | Compound defect or disabled analysis |
| Disconnected | Disconnected | Disconnection |

<SEVENTH EMBODIMENT>

A seventh embodiment according to this invention will be described next. A construction of the system for putting the embodiment into practice is shown in FIG. 54. As will be apparent from the drawing, this embodiment combines the first (FIG. 38), second (FIG. 41) and fourth (FIG. 48) embodiments. An attribute data detected from the pattern to be inspected, shown in FIG. 45, and a defect decision result are shown in TABLE 15 together with the design data.

The processing is exactly the same as the first, second and fourth embodiments. However, a processing for deciding synthetically a decision result obtained from the contracted pattern, a decision result obtained from the expanded pattern and a decision result obtained from the original pattern is added finally. That is, as shown in TABLE 16, perfect disconnection, perfect short circuit, fine disconnection, fine short circuit, small pattern width and small pattern interval can be detected distinctively and will not be missed according to the three decision results. Thus, according to this embodiment, defects can be detected perfectly in distinction each.

Attribute data is expressed in 4 bits including spares, as:

$$4 \text{ bits} \times 256^2 = 262{,}144 \text{ bits}$$
$$= 32.768 \text{ kbytes}$$

Where all the memory capacities are calculated each the first to seventh embodiments:

| First embodiment | 294.912 kbytes |
| Second embodiment | 294.912 kbytes |
| Third embodiment | 458.752 kbytes |
| Fourth embodiment | 294.912 kbytes |
| Fifth embodiment | 458.752 kbytes |
| Sixth embodiment | 458.752 kbytes |
| Seventh embodiment | 622.592 kbytes |

TABLE 15

| Address | Design data | Attribute data | | | Result | | | Decision |
| | | Original pattern | Contracted pattern | Expanded pattern | Original pattern | Contracted pattern | Expanded pattern | |
| --- | --- | --- | --- | --- | --- | --- | --- | --- |
| 1 | 2 | 1 | 1 | 1 | Non-defective | Disconnected | Non-defective | Small pattern width |
| 2 | 1 | 2 | 1 | 2 | | | | |
| 3 | 4 | 1 | 1 | 1 | Non-defective | Non-defective | Non-defective | Non-defective |
| 4 | 3 | 2 | 2 | 2 | | | | |
| 5 | 6 | 1 | 1 | 1 | Non-defective | Non-defective | Non-defective | Non-defective |
| 6 | 5 | 2 | 2 | 2 | | | | |
| 7 | 8 | 1 | 1 | 1 | Disconnected | Disconnected | Non-defective | Fine disconnection |
| 8 | 7 | 1 | 1 | 2 | | | | |
| 9 | 10 | 3 | 1 | 3 | Short-circuited | Non-defective | Short-circuited | Fine short circuit |
| 10 | 9 | 3 | 2 | 3 | | | | |
| 11 | 12 | 1 | 1 | 3 | Non-defective | Non-defective | Short-circuited | Small pattern interval |
| 12 | 11 | 2 | 2 | 3 | | | | |

TABLE 16

| Decision result from attribute data | | | Decision result |
| Original pattern | Contracted pattern | Expanded pattern | (Defect candidate) |
| --- | --- | --- | --- |
| Non-defective | Non-defective | Non-defective | Non-defective |
| Non-defective | Non-defective | Short-circuited | Small pattern interval |
| Short-circuited | Non-defective | Short-circuited | Fine short circuit |
| Short-circuited | Short-circuited | Short-circuited | Short circuit |
| Non-defective | Disconnected | Non-defective | Small pattern width |
| Disconnected | Disconnected | Non-defective | Fine disconnection |
| Disconnected | Disconnected | Disconnected | Disconnection |
| Other than the above-mentioned | | | Compound defect or disabled analysis |

<CONSIDERATION>

Next, a memory capacity and a processing time necessary for the above-described seven embodiments will be taken up for consideration.

Assuming the pad is present at 256×256 points in one substrate, the memory capacity is calculated, first. In this case, the pad number can be represented in 16 bits (2 bytes). If all the pads are detected on connectivity processing, a created connectivity data is:

$$16 \text{ bits} \times 256^2 = 1{,}048{,}576 \text{ bits}$$
$$= 131.072 \text{ kbytes}$$

Then, design data is:

$$16 \text{ bits} \times 256^2 = 1{,}048{,}576 \text{ bits}$$
$$= 131.072 \text{ kbytes}$$

When a 64-kbyte RAM is used, these will be necessary in 36 to 76 pieces. In consideration of the future increase in RAM capacity, a further decrease in software volume can be expected. For example, as compared with information content 900 Mbits (=112.5 Mbytes) of an original picture image when 150 mm square substrate is detected on a 5 mm resolution, these may be taken fairly compact.

Then, with reference to the processing time, a conversion from the connectivity data into a cyclic list structure will be performed one time only before inspection, therefore it can be excluded from the processing time, and thus it will be appreciated according to a reference frequency of the design data. If an average pad number on one connected pattern is n, then, assuming that all patterns are free from defect, an average reference frequency necessary for finding the root pad at the time of attribute data creation will be:

$$\sum_{i=1}^{n} \frac{\{n - (i - 1)\}}{n} = \frac{n + 1}{2}$$

Accordingly, $$\frac{n+1}{2} \times 256^2$$

at the time of 256×256 pads. Now, if there is a defect wherein the root pad cannot be found, the reference frequency is n+1 from $$\frac{n+1}{2},$$

therefore:

$$\left(\frac{n+1}{2} \times 0.99 + (n+1) \times 0.01\right) \times 256^2 =$$

$$\left(\frac{n+1}{2} \times 256^2\right) \times 1.01$$

If n=4, then a reference must be made to the design data 165,478.4 times. Further, since the reference will be made to all design data one time only, the reference is necessary at:

$$256^2 = 65,536 \text{ times}$$

A processing from the pickup device 21 to a creation of the connectivity data on the connectivity processor 23 can be effected on real time. Accordingly, assuming that a 150 mm square substrate is inspected on a 5 μm resolution by means of a device requiring, for example, 100 μs for referring one time to the design data, with the sampling frequency of an image pickup signal working at 5 MHz, a microcomputer working as the processor, times required for overall inspection on the first to seventh embodiments will be:

| | |
|---|---|
| First embodiment | 203.1 sec. |
| Second embodiment | 203.1 sec. |
| Third embodiment | 226.2 sec. |
| Fourth embodiment | 203.1 sec. |
| Fifth embodiment | 226.2 sec. |
| Sixth embodiment | 226.2 sec. |
| Seventh embodiment | 249.3 sec. |

As described above, according to the pattern defect detecting art relating to this invention, a pattern is detected on an optical means without contact, and a concatenation between pads is obtained through image processing, therefore a defect inspection can be effected with high reliability and at high speed without being influenced by some fluctuation of the object pattern and also without disturbing the pattern.

Particularly, a list structure is employed for the design data indicating a connectivity, therefore as compared with a representation in a connection matrix, data compression from $256^2 \times 256^2 \approx 2.56 \times 10^9$ bits to $1.05 \times 10^6$ bits can be realized in the case, for example, for a 256×256 pad, and processing time can also sharply be decreased.

What is claimed is:

1. An apparatus for detecting a defect of a pattern comprising:
   image pickup means for sensing an optical image of a pattern on an XY plane by scanning individual lines along the X-direction and line-by-line along a subscanning Y-direction for providing an electrical image signal;
   a binary digitizing circuit which transforms said electrical image signal into corresponding binary signals representing picture elements;
   a connection data generator including:
      a pad position table memory for storing pad position coordinates (Xi, Yi) with representative pad numbers Ni,
      line segment generation means for generating a start position u and an end position v, in the X coordinate, of a line segment of the pattern detected along a main scanning line,
      pad number assigning means for assigning said pad number Ni as labels to a line segment when said pad position coordinates (Xi, Yi) satisfy a condition $u \leq Xi \leq v$,
      labelling means for determining that a label representation M corresponds to the minimum label value representation of a first label value $M_0$ and a second label value $M_1$ when a corresponding first line segment is determined as being connected along the subscanning direction Y to a corresponding second line segment, said first label $M_0$ and second label $M_1$ correspond to the detection of line segments, as represented by pad numbers Ni, detected along respective adjacent scanning lines, and wherein said label representation M corresponds to a label value $M_2$ when said first line segment is connected to said second line segment and one of said two line segments has the label value representation $M_2$ and the other one of said line segments has no representative label value assigned, and assigning M to said first and second line segments, and
      a connectivity table memory for storing the connection data signals representative of a connectivity relationship expressed by said minimum label signal M as a data D(I) corresponding to address A(I) of said first and second label signals $M_0$ and $M_1$, respectively, showing said pad positions; and
   comparison means for comparing said connection data signals read out from said connectivity table memory of said connection data generator with design data signals expressed in the form of a cyclic list of symbols assigned to pads in the connectivity relationship, whereby a determination of a defect of the pattern is made based on the output of said comparison means.

2. An apparatus according to claim 1, wherein said pattern comprises a wiring pattern.

3. An apparatus according to claim 1, wherein said pattern comprises a circuit pattern.

4. An apparatus according to claim 1, wherein said connection data generator further includes storing means for storing information of said start position u and said end position v generated from said line segment generation means, said storing means being provided between said line segment generation means and said pad number assigning means.

5. An apparatus according to claim 1, wherein said connection data generator further includes a plurality of line buffer memory means for storing said binary signals for each of the lines transformed by said binary digitizing circuit, and switching means for alternately reading out from said plurality of line buffer memory means said binary signals stored therein and for transferring serially said binary signals corresponding to each of the lines to said line segment generation means.

6. An apparatus according to claim 1, wherein said connection data generator further includes a plurality of line table memory means for storing said pad numbers Ni assigned by said pad number assigning means, and switching means for alternately reading out from said plurality of line table memory means said pad numbers Ni stored therein and for transferring serially said pad numbers Ni corresponding to each of the lines to said labelling means.

7. An apparatus for detecting a defect of a pattern comprising:

image pickup means for sensing optical images of both a reference circuit pattern, being provided prior to effecting a defect detection process, and a corresponding circuit pattern for inspection on an XY plane by scanning individual lines along the X-direction and line-by-line along a subscanning Y-direction direction for providing electrical image signals representative of both said reference circuit pattern and said circuit pattern for inspection;

a binary digitizing circuit which transforms said electrical image signals representative of both said reference circuit pattern and said circuit pattern for inspection into corresponding binary signals representing picture elements of both;

a connection data generator including:

a pad position table memory for storing pad position coordinates (Xi, Yi) with representative pad numbers Ni, line segment generation means for generating a start position u and an end position v, in the X coordinate, of a line segment detected along a main scanning line of both circuit patterns, pad number assigning means for assigning said pad number Ni as labels to a line segment of each of said circuit patterns when said pad position coordinates (Xi, Yi) satisfy a condition $u \leq Xi \leq v$ and Yi=Y coordinate of said main scanning line, labeling means for determining that a label representation M corresponds to the minimum label value representation of a first label value $M_0$ and a second label value $M_1$ when a corresponding first line segment of each of said circuit patterns is determined as being connected along the subscanning direction Y to a corresponding second line segment of each of said circuit patterns, said first label $M_0$ and second label $M_1$ correspond to the detection of line segments as represented by pad numbers Ni, detected along respective adjacent scanning lines, and wherein said label representation M corresponds to a label value $M_2$ when said first line segment is connected to said second line segment and one of said two line segments has the label value representation $M_2$ and the other one of said line segments has no representative label value assigned, and assigning M to said first and second line segments of each of said circuit patterns, and a connectivity table memory for storing the connection data signals representative of a connectivity relationship expressed by said minimum label signal M as a data D(1) corresponding to address A(1) of said first and second label signals $M_0$ and $M_1$, respectively, showing said pad positions of each of said circuit patterns;

design data generating means for converting said connection data signals read out from said connectivity table memory of said connection data generator and produced with respect to said reference circuit pattern, prior to said defect detection process, into corresponding design data expressed in the form of a circulation list of pad numbers Ni assigned to pads in the connectivity relationship representative of said reference circuit pattern;

design data storing means for storing said design data; and comparison means for comparing said connection data signals read out from said connectivity table memory of said connection data generator and being produced with respect to said circuit pattern for inspection with said corresponding design data signals read out from said design data storing means which are representative of said reference circuit pattern, whereby a determination of the defect of the inspecting circuit pattern is made based on the output of said comparison means.

* * * * *